(12) United States Patent
Vignat et al.

(10) Patent No.: US 12,053,932 B2
(45) Date of Patent: Aug. 6, 2024

(54) SYSTEMS AND METHODS FOR DETERMINING SUPPORT STRUCTURES IN ADDITIVE MANUFACTURING

(71) Applicants: HEXAGON TECHNOLOGY CENTER GMBH, Heerbrugg (CH); L'INSTITUT POLYTECHNIQUE DE GRENOBLE, Grenoble (FR)

(72) Inventors: Frederic Vignat, Grenoble (FR); Christelle Grandvallet, Grenoble (FR)

(73) Assignees: HEXAGON TECHNOLOGY CENTER GMBH, Heerbrugg (CH); L'INSTITUT POLYTECHNIQUE DE GRENOBLE, Grenoble (FR)

( * ) Notice: Subject to any disclaimer, the term of this patent is extended or adjusted under 35 U.S.C. 154(b) by 0 days.

(21) Appl. No.: 17/504,436

(22) Filed: Oct. 18, 2021

(65) Prior Publication Data

US 2022/0118713 A1    Apr. 21, 2022

Related U.S. Application Data

(60) Provisional application No. 63/093,099, filed on Oct. 16, 2020.

(51) Int. Cl.
*B29C 64/40* (2017.01)
*B33Y 10/00* (2015.01)
(Continued)

(52) U.S. Cl.
CPC ............... *B29C 64/40* (2017.08); *B33Y 10/00* (2014.12); *B33Y 30/00* (2014.12); *B33Y 80/00* (2014.12)

(58) Field of Classification Search
CPC .. G06F 2113/10; G06F 2119/18; G06F 30/20; B29C 64/386; B29C 64/40;
(Continued)

(56) References Cited

U.S. PATENT DOCUMENTS

2015/0066178 A1* 3/2015 Stava ..................... B29C 64/40
                                                              700/98
2016/0085882 A1 3/2016 Li et al.
(Continued)

FOREIGN PATENT DOCUMENTS

EP           3203443 A3    9/2017

OTHER PUBLICATIONS

International Search Report and Written Opinion for PCT/IB2021/000712, mailed Apr. 4, 2022.
(Continued)

*Primary Examiner* — Emmanuel S Luk
*Assistant Examiner* — Victoria Bartlett
(74) *Attorney, Agent, or Firm* — Concept IP LLP; Pejman Yedidsion

(57) ABSTRACT

Systems devices, and methods including: an additive manufacturing component having tools for manufacturing parts and a support structure associated with a part being manufactured; a computing device configured to: identify a region to support on the part being manufactured; determine a set of one or more slices via an iterative process; determine a set of support lines based on the determined set of one or more slices; determine a density associated with the determined set of support lines; and transmit instructions to the additive manufacturing component to add a slice on to the support structure based on the determined set of support lines and associated density; and where the additive manufacturing component is configured to execute a series of instructions to connect the support structure to the region to support via the determined set of support lines.

21 Claims, 24 Drawing Sheets

(51) Int. Cl.
*B33Y 30/00* (2015.01)
*B33Y 80/00* (2015.01)

(58) Field of Classification Search
CPC ......... B33Y 10/00; B33Y 30/00; B33Y 50/00; B33Y 80/00
See application file for complete search history.

(56) References Cited

U.S. PATENT DOCUMENTS

| | | | |
|---|---|---|---|
| 2017/0225397 A1* | 8/2017 | Ho | B29C 64/40 |
| 2018/0162058 A1* | 6/2018 | Lefebvre | B22F 10/80 |
| 2020/0061923 A1* | 2/2020 | Tsai | B29C 64/40 |

OTHER PUBLICATIONS

J. Vanek et al., "Clever Support: Efficient Support Structure Generation for Digital Fabrication", Computer Graphics Forum: Journal of the European Association for Computer Graphics, vol. 33, No. 5, Aug. 1, 2014 (Aug. 1, 2014), pp. 117-125, XP05537, Oxford ISSN: 0167-7055, DOI: 10.1111/cfg. 12437 abstract p. 120-p. 123.
Shi Kanle et al., "Slicing and support structure generation for 3D printing directly on B-rep models", Visual computing for industry, biomedicine and art, May 22, 2019 (May 22, 2019), pp. 1-10, XP055903050, Singapore DOI: 10.1186/s42492-019-0013-x.

\* cited by examiner

SYSTEMS AND METHODS FOR DETERMINING SUPPORT STRUCTURES IN ADDITIVE MANUFACTURING

CROSS-REFERENCE TO RELATED APPLICATIONS

This application claims priority to and the benefit of U.S. Provisional Patent Application No. 63/093,099, filed Oct. 16, 2020, the contents of which are hereby incorporated by reference herein for all purposes.

TECHNICAL FIELD

Embodiments relate generally to additive manufacturing of parts, and more particularly, to adding support structures to a region of a part to be created in order to avoid part deformation during manufacturing.

SUMMARY

A system embodiment may include: an additive manufacturing component having tools for manufacturing parts and a support structure associated with a part being manufactured; a computing device in communication with the additive manufacturing component, where the computing device having a processor and an addressable memory, may be configured to: identify a region to support on the part being manufactured; determine a set of one or more slices via an iterative process, the set of one or more slices defined by a position for a connecting line between the support structure and the region to support on the part, where each slice of the set of one or more slices comprises a set of reference points; determine a set of support lines based on the determined set of one or more slices, where the set of support lines may be along a maximum three-dimensional slope of the support structure between two reference points of two distinct slices; determine a density associated with the determined set of support lines where the density may be the distance between each support line and may be adjusted to not exceed a maximum or minimum density; and transmit instructions to the additive manufacturing component to add a slice on to the support structure based on the determined set of support lines and associated density; and where the additive manufacturing component may be configured to execute a series of instructions to connect the support structure to the region to support via the determined set of support lines thereby producing a support structure that may be not rigid above a threshold and prone to deformation.

In additional system embodiments, the set of support lines may be further determined by calculating a maximum gradient vector for each support line of the set of support lines. In additional system embodiments, region to support may be defined by an angle that the surface of the region to support subtends relative to the (negative) z direction. In additional system embodiments, the support structure may provide additional structural support to the region to support of the part being manufactured.

In additional system embodiments, at each iteration of the determination of the set of support lines, a density of each support line of the set of support lines may be calculated. In additional system embodiments, at each iteration of the determination of the set of support lines, along each support line, the distance between each line and nearest neighbor line of the support line may be calculated along a given slice. In additional system embodiments, at each iteration of the determination of the set of support lines, support lines may be interrupted or terminated to prevent the density from exceeding a maximum threshold density value. In additional system embodiments, each slice comprises at least one reference point and a set of one or more reference points may be removed in order to terminate a support line and decrease the density below a threshold maximum density.

In additional system embodiments, at each iteration of the determination of the set of support lines, the density may be below a minimum threshold density the distance between the adjacent points may be divided in half and a new point may be put at that midpoint between the support lines. In additional system embodiments, each slice comprises at least one reference point and a set of one or more reference points may be added to a slice to increase the density above a minimum threshold density.

A method embodiment may include: identifying, by a computing device in communication with an additive manufacturing component, where the computing device having a processor and an addressable memory, a region to support on the part being manufactured; determining, by the computing device, a set of one or more slices via an iterative process, the set of one or more slices defined by a position for a connecting line between the support structure and the region to support on the part, where each slice of the set of one or more slices comprises a set of reference points; determining, by the computing device, a set of support lines based on the determined set of one or more slices, where the set of support lines may be along a maximum three-dimensional slope of the support structure between two reference points of two distinct slices; determining, by the computing device, a density associated with the determined set of support lines where the density may be the distance between each support line and may be adjusted to not exceed a maximum or minimum density; and transmitting, by the computing device, instructions to the additive manufacturing component to add a slice on to the support structure based on the determined set of support lines and associated density; and executing, by the additive manufacturing component having tools for manufacturing parts and a support structure associated with a part being manufactured, a series of instructions to connect the support structure to the region to support via the determined set of support lines thereby producing a support structure that may be not rigid above a threshold and prone to deformation.

In additional method embodiments, the set of support lines may be further determined by calculating a maximum gradient vector for each support line of the set of support lines. In additional method embodiments, region to support may be defined by an angle that the surface of the region to support subtends relative to the (negative) z direction. In additional method embodiments, the support structure provides additional structural support to the region to support of the part being manufactured.

In additional method embodiments, at each iteration of the determination of the set of support lines, a density of each support line of the set of support lines may be calculated. In additional method embodiments, at each iteration of the determination of the set of support lines, along each support line, the distance between each line and nearest neighbor line of the support line may be calculated along a given slice. In additional method embodiments, at each iteration of the determination of the set of support lines, support lines may be interrupted or terminated to prevent the density from exceeding a maximum threshold density value. In additional method embodiments, each slice comprises at least one reference point and a set of one or more reference points may be removed in order to terminate a support line 210 and decrease the density below a threshold maximum density.

In additional method embodiments, at each iteration of the determination of the set of support lines, the density may be below a minimum threshold density the distance between the adjacent points may be divided in half and a new point may be put at that midpoint between the support lines. In additional method embodiments, each slice comprises at least one reference point and a set of one or more reference points may be added to a slice to increase the density above a minimum threshold density.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
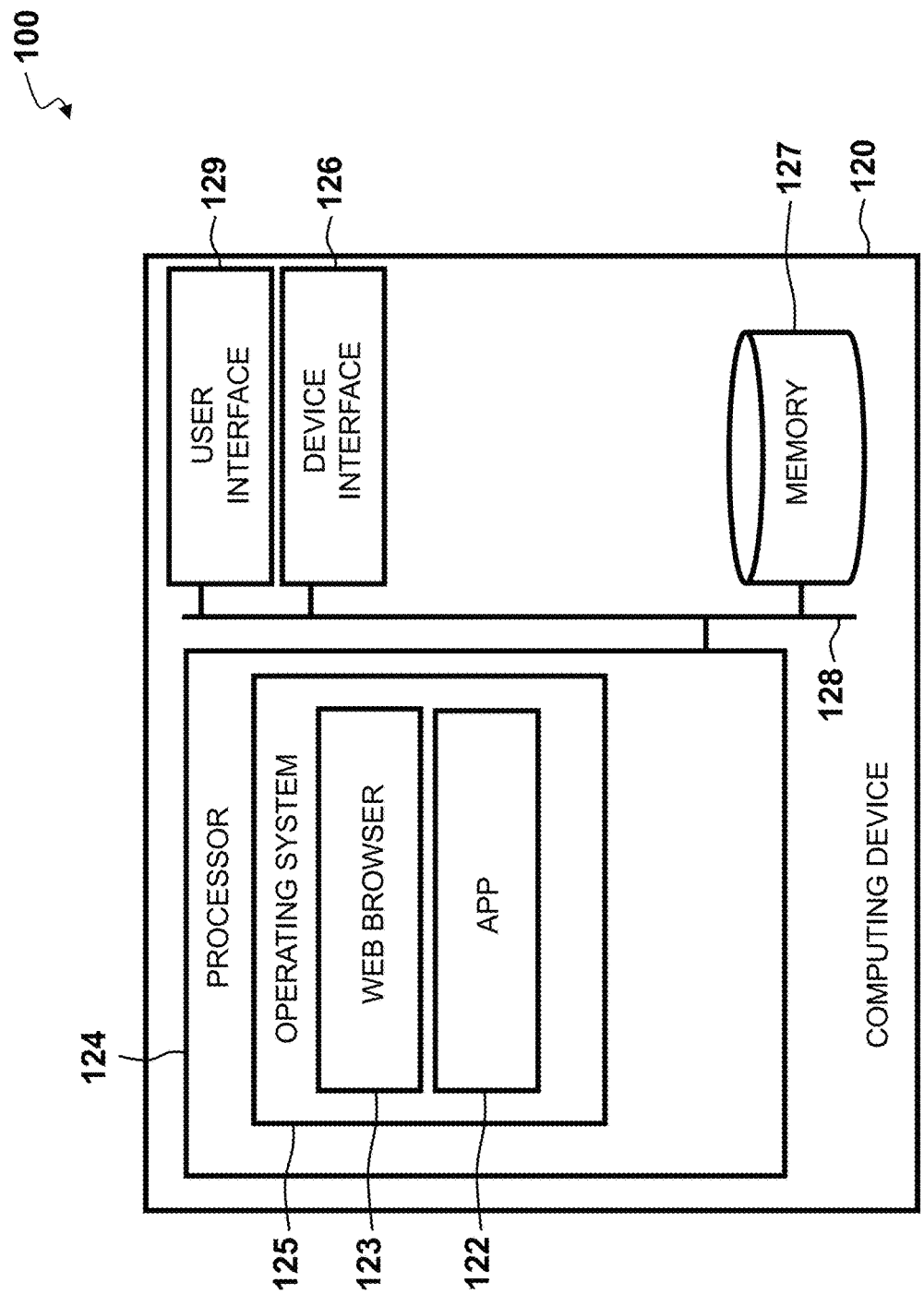
FIG. 1 depicts a top-level functional block diagram of a computing device system in a computer aided manufacturing (CAM) environment.

Additive manufacturing (AM), also known as 3D printing, is considered the construction of a three-dimensional object from a Computer-aided design (CAD) model or a digital 3D model. Additive Manufacturing refers to a variety of manufacturing processes where a part is built by adding material to a smaller base versus traditional subtractive manufacturing whereby material is removed, machined, from a larger stock. In powder bed additive manufacturing for example, a heat source melts the powder layer by layer, and in direct metal deposition the material is added, commonly as a solid or powder, to a melt pool created by a heat source. During this process, support structures are required to support overhanging features while building a part by AM. Support structures may inherently increase the build time and cost of manufacturing and also have an adverse effect on the surface finish of the part; accordingly, methods and system embodiments for optimizing generation of support structures in AM is disclosed.

The present embodiments disclose methods and systems for determining the position or location of a set of connecting lines between support structures and a region to support (RTS) of the part. The support structures may be defined as additional elements used to prevent part deformation during the AM process. The RTS may be related to the region of the part surface that needs to be connected to a support structure. A system embodiment may include: a manufactured part with a region to support (RTS), an additive manufacturing component having a processor, and a computing device having a processor and addressable memory, the additive manufacturing component configured to manufacture a part based on received instructions from the computing device that may be configured to: determine a position for a support line on a support structure to support the RTS, calculate a maximum gradient vector for the support line; generate the support line based on the determined position and the calculated maximum gradient vector; and transmit a set of instructions to the additive manufacturing component to add the support structure based on the support line to the manufactured part. A method embodiment may include: a step for determining a position for a support line on a support structure to support a region to support (RTS) on a part, a step for creating a support structure, a step for calculating a maximum gradient vector for the support line, a step for generating the support line based on the determined position and calculated maximum gradient vector, a step for adding a slice to the support line, a step for determining whether a line density threshold has been met, and a step for iteratively repeating steps from the step for determining a position for a support line to the step for adding a slice to the support structure until the line density threshold has been met, if the line threshold has not been met. These steps will be described in more details below.

The described technology concerns one or more methods, systems, apparatuses, and mediums storing processor-executable process steps for creating a support structure to connect to a region of a part surface in a computer aided manufacturing (CAM) environment. In one embodiment, creating a support structure includes determining a position of support lines for connecting the support structure and a region to support the part surface. In one embodiment, the RTS may be defined as the region of the part surface that needs to be connected to the support structure in order to support the part during the printing process to ensure a stable, error free, and successful print. The support structure may have additional elements, such as support lines, to prevent part deformation during additive manufacturing. In one embodiment, the support lines are constructed by defining the maximum slope of the support lines along the region to support in order to support the part to be created; thereby managing and/or determining the density of support lines of the support structure. The techniques introduced below may be implemented by programmable circuitry programmed or configured by a system having a processor and addressable memory, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-17 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

With respect to FIG. 1, an example of a top-level functional block diagram of a computing device system 100 is illustrated. The system 100 is shown as a computing device 120 comprising a processor 124, such as a central processing unit (CPU), addressable memory 127, an external device interface 126, e.g., an optional universal serial bus port and related processing, and/or an Ethernet port and related processing, and an optional user interface 129, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 120, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 128. In some embodiments, via an operating system 125 such as one supporting a web browser 123 and applications 122, the processor 124 may be configured to execute steps of a process for a user to create support structure layers for a main layer of a part to be created or constructed in a CAM environment.

The system 100 is configured to create support structure layers of a contoured main layer part in a CAM environment either automatically or in response to a user request during the AM process. In the course of formation, a part may have one or more regions of the part (or surfaces of the part) that may need to be further reinforced to help support the construction of the part. More specifically, a plurality of construction support lines may be introduced and determined by the system for connecting a support structure and a region to support the part.

Typically, additive manufacturing, or 3D printing, may include a variety of processes in which material is joined or solidified under computer control to create a three-dimensional object, with material being added together (such as liquid molecules or powder grains being fused together). This is usually performed layer by layer. Such layering may require certain areas to provide stronger support to the overall structure. The layered structure of such processes may inevitably lead to a stair-stepping effect on part surfaces which are curved or tilted with respect to the building platform. The effects may mainly depend on the orientation of a part surface inside the building process. In one embodiment, internal supports may be introduced for overhanging features during construction for such methods and processes. In some instances, overhang features, e.g., large regions hanging over a void without sufficient support from the lower structure may be inaccessible. Self-supporting overhang structures produced by additive manufacturing may then require additional layers of support to be produced and add additional complexity to the additive process, for example, to account for the layer thickness. Overhanging structures or features may then be accounted for and supported using the disclosed embodiments of the present application.

Figure 2:
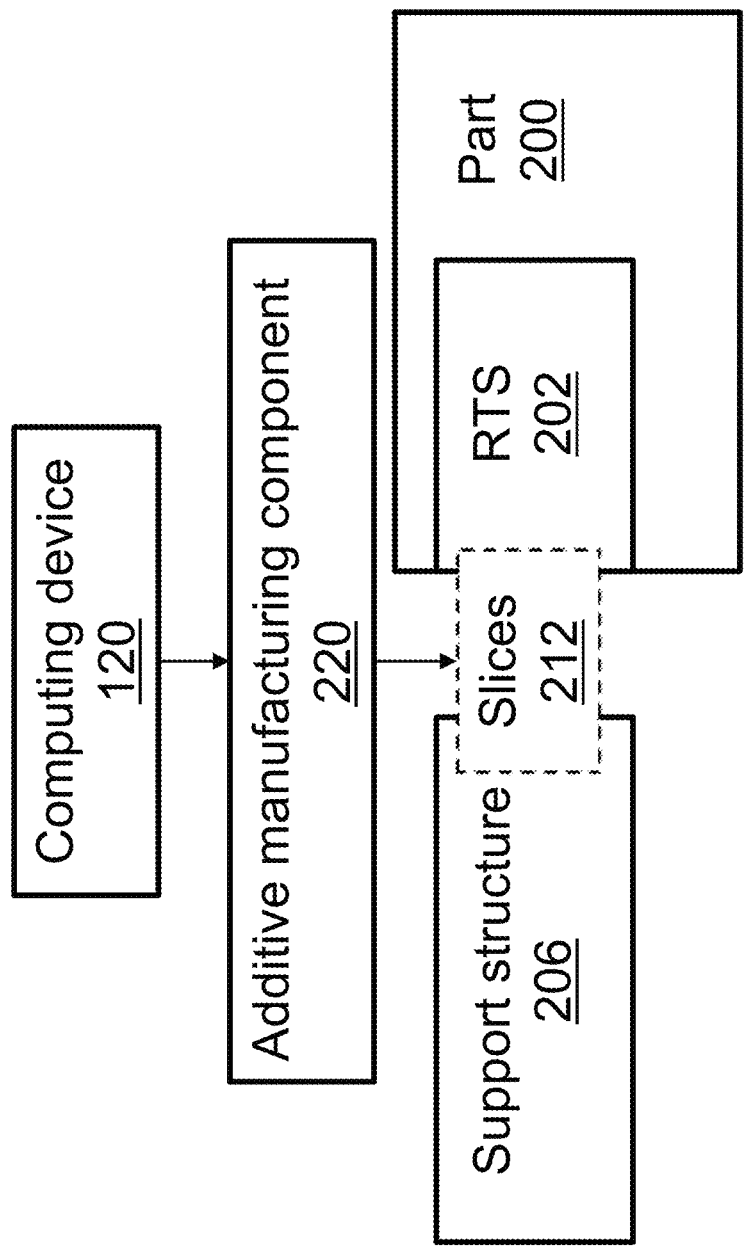
FIG. 2 depicts a block diagram of the present system.

With respect to FIG. 2, the present system may include a computing device 120 connected to an additive manufacturing component 220. The additive manufacturing component 220 may use a powder bed process, a material extrusion process, a sheet lamination process or the like to build parts. The computing device 120 may provide instructions to the additive manufacturing component 220. The provided instructions may include instructions for constructing support lines 212 on a region to support (RTS) 202 of a part 200 to connect support structures. In one embodiment, the computing device 120 and the additive manufacturing component 220 may be the same component and in alternative embodiments, the additive manufacturing component 220 may be a separate component and in communication with the computing device 120.

Figure 3:
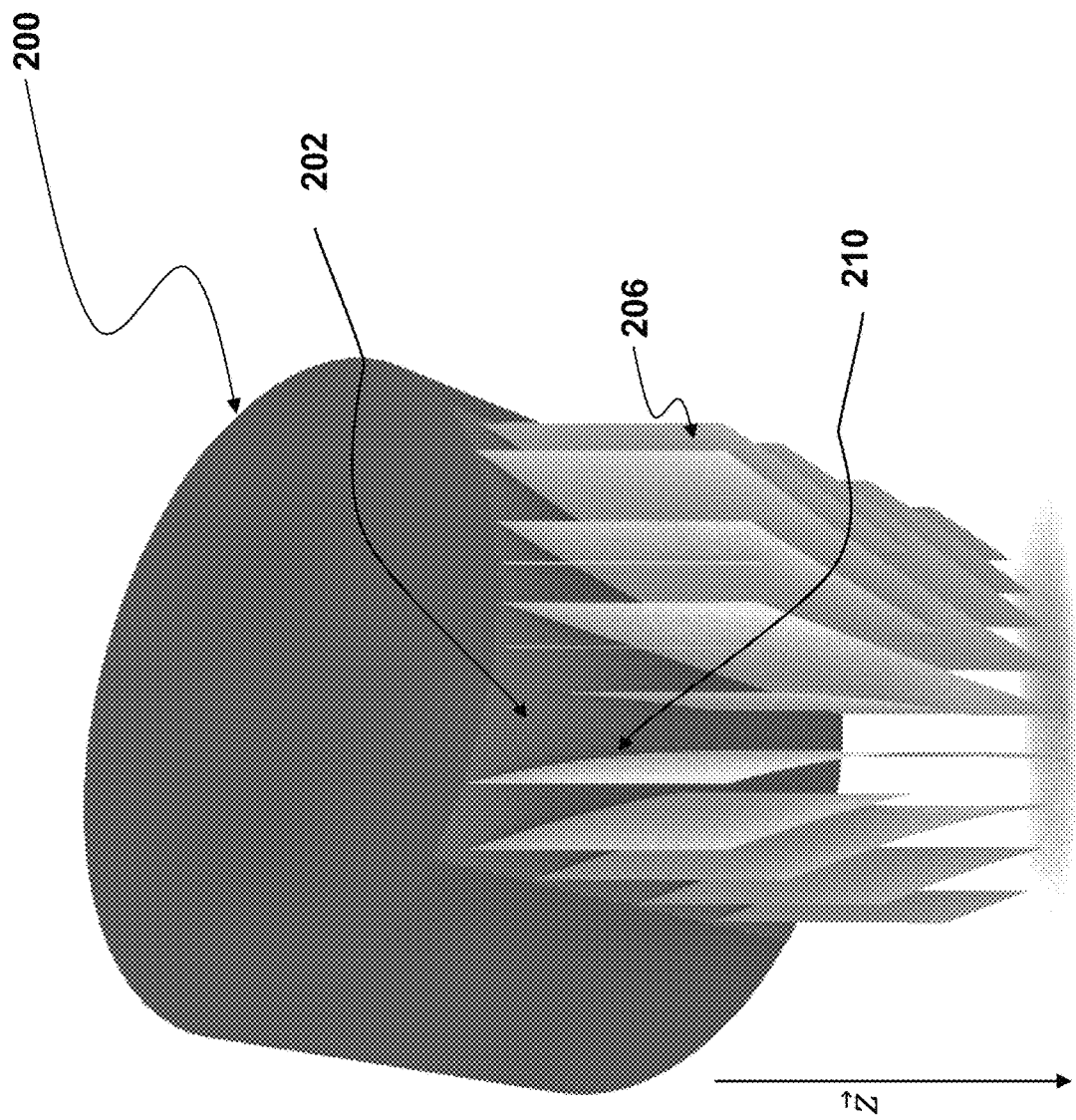
FIG. 3 depicts a graphical representation of a support structure and a region to support.

With respect to FIG. 3, a graphical representation of a region to support (RTS) 202 of a part 200 is shown. In one embodiment, the RTS 202 may be defined by the angle that the surface of the RTS 202 subtends relative to the (negative) $\vec{z}$ direction, shown as the downward vertical direction in FIG. 3. In one embodiment, the system may create a new, three-dimensional support structure 206 with the computing device 120 (see FIG. 2), where the new support structure 206 may provide additional structural support to the RTS 202 of the part 200 to be created. The support structure 206 may include support lines 210. In one embodiment, the support lines 210 may connect the support structure 206 to the RTS 202. The support structure 206 may provide for avoiding deformation of the part 200, such as warping due to thermal effects. In one embodiment, the support structure 206 to be created may fit the contour of the RTS 202.

Figure 4A:
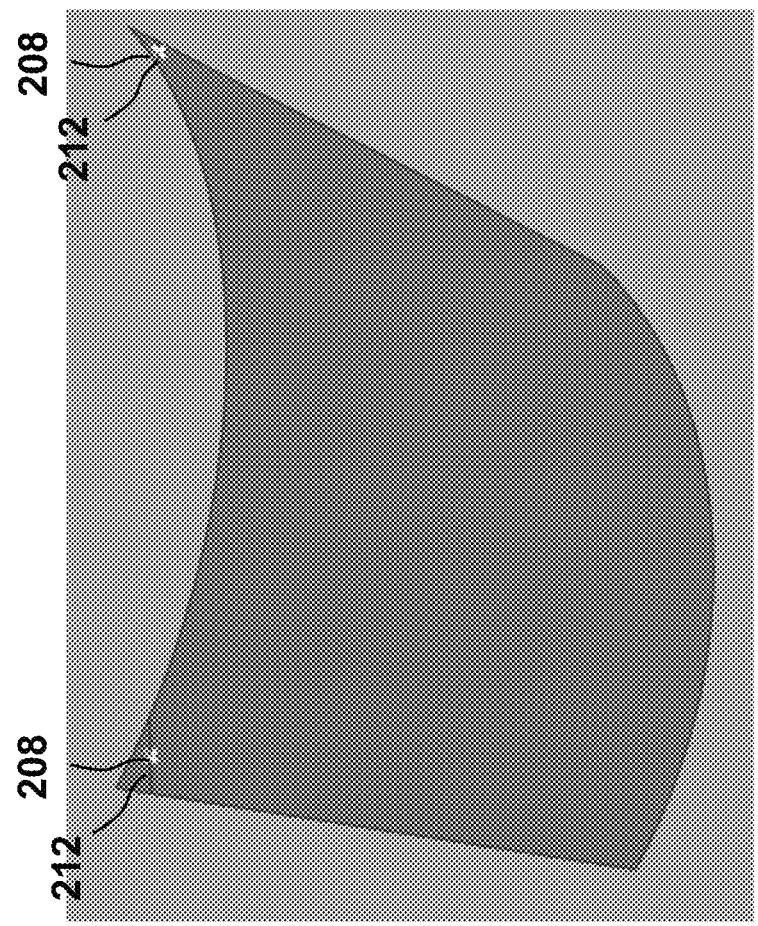
FIGS. 4A-4B respectively depicts a graphical representation and a block diagram of a first iteration of constructing connecting support lines for forming the support structure to the support region of FIG. 3.

The new support structure 206 may have a plurality of points 208 (see FIG. 4A). These points may act as reference points where the system may create support connection lines along the maximum three-dimensional slope of the RTS 202 between two points 208 of two distinct slices, as described in detail below. In some embodiments, the density of support connection lines may be adjusted. More specifically, the number of support lines added (or removed) to the support structure 206 may be fine-tuned by the system so as to not exceed a maximum or minimum density of lines, which may be defined as the distance between support lines; thus, producing a support structure that is not rigid above a threshold or prone to deformation, where the threshold may be determined by user experience or simulation programs executed on the processor of the machine.

Figure 4B:
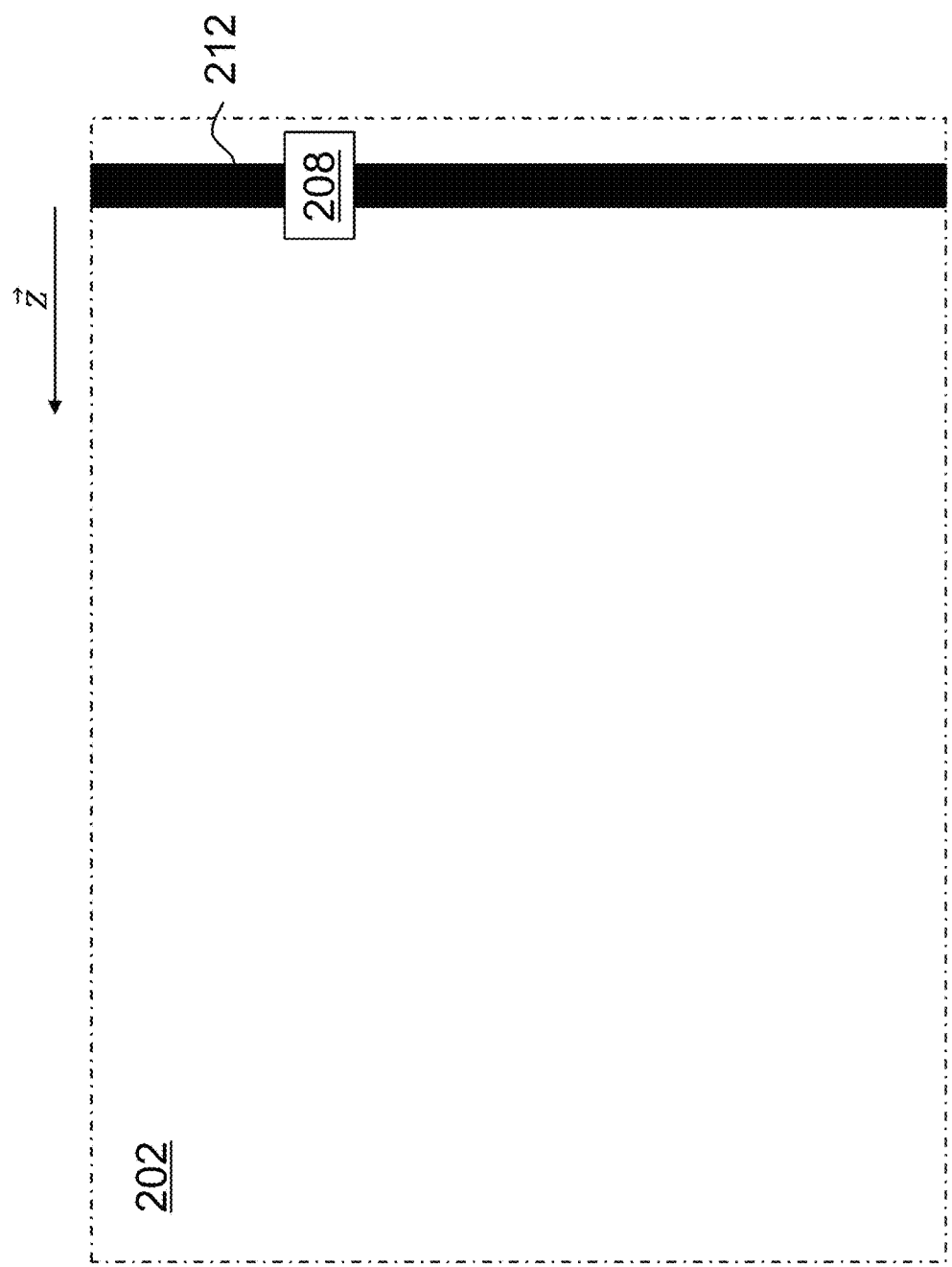

With respect to FIGS. 4A-4B, a user may construct a new support structure to support a RTS 202 of a part which requires support. In one embodiment, creating a support structure includes determining a position of support lines for connecting the support structure and a region to support (the part to be created). In one embodiment, the region to support may be related to the region of the part surface that needs to be connected to the support structure. That is, all the RTS areas need to be connected.

The final three-dimensional support structure 206 (as shown in FIG. 3) may be constructed by iteratively adding, removing, and/or terminating support lines to the RTS 202. More specifically, a first curve or "slice" 212 (FIG. 4A) may include at least one reference point 208. The construction of the three-dimensional support structure may be done by an additive manufacturing component such as powder beds, sheet lamination, material extrusion, and the like. The points 208 may represent the first intersection between the constructing plane perpendicular to the downward z direction and the RTS 202. In another embodiment, the points 208 may represent the first intersection between the constructing plane perpendicular to the upward z direction.

FIG. 4B is a block diagram representation of a first iteration of constructing connecting support lines as shown in FIG. 4A. Within RTS 202, the first slice 212 may be constructed using at least one initial reference point 208 positioned away from an end of the RTS 202. The first slice 212 may then be oriented to be perpendicular with the z direction.

Figure 5A:
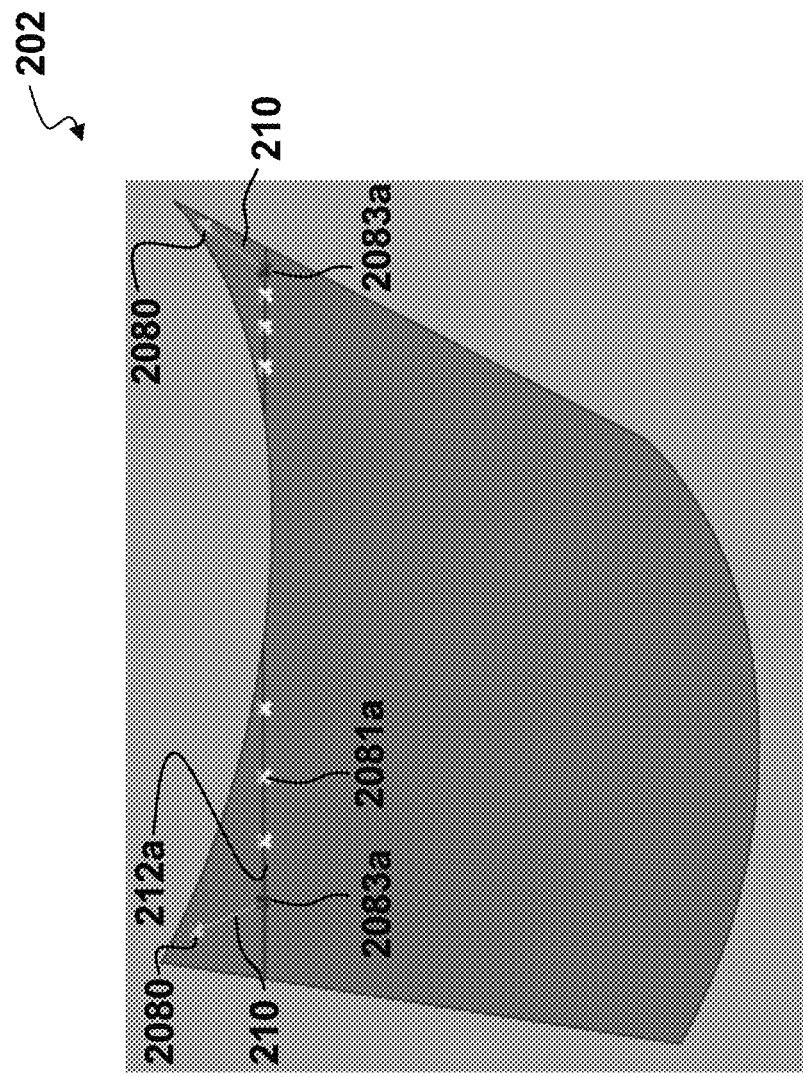
FIGS. 5A-5B respectively depict a graphical representation and a block diagram of a second iteration of constructing connecting support lines for forming the support structure to the support region of FIG. 3.
Figure 5B:
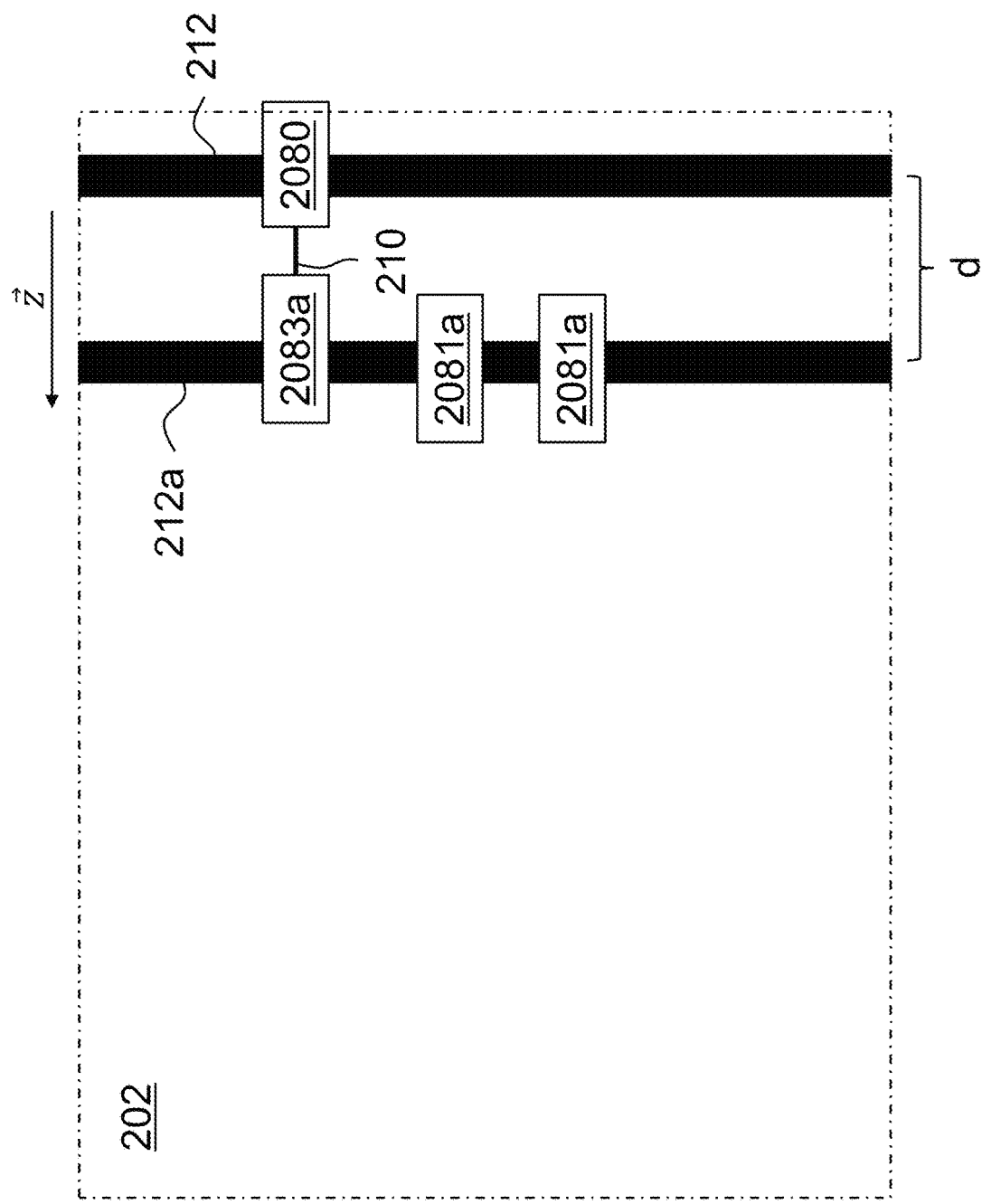

With respect to FIGS. 5A-5B, the system may add a new slice 212a, with the new slice 212a located some distance d from the first slice 212 (see FIG. 4A). In one embodiment, the distance between slice 212 and slice 212a may be an increment of the z direction, such as, for example, an increment between 50 and 100 microns in the downward z direction. In another embodiment, the distance d between slice 212 and slice 212a may be an increment of the z direction, such as an increment between 50 and 100 microns in the upward z direction. In one embodiment, the increment of distance in the z direction is a parameter that may be adjusted by the system. The system may consider a number of factors for adjusting the increments, for example, precision on one side and calculation time on the other side.

In one embodiment, a user may define a density of the support structure 206 (see FIG. 3) to be achieved by adding support lines 210. In one embodiment, the support structure 206 may have a user-defined optimal density of support lines 210 to ensure a density of support to meet a threshold defined either by the system or user. For example, the threshold may be defined by too few lines 210 may result in unwanted part deformation, while too many lines 210 may result in overlapping fusion between supports.

In one embodiment, and continuing with FIG. 5A, the system may insert a support line 210 between a starting reference point 2080 (determined previously as reference 208 in FIG. 4A) of the slice 212 and an ending reference point 2083a of the slice 212a. In one embodiment, each support line 210 may follow a maximum gradient vector, e.g., maximum slope vector along the contour of the support structure 206 in three dimensions. As such, each support line 210 may follow the maximum slope from the starting point 2080 of the first slice 212 to the associated ending point 2083a of the second slice 212a, with the support line following the maximum slope along the RTS 202. For example, a certain reference point 208, such as starting reference point 2080 may have a vector $\vec{n}$ normal to a surface where $\vec{n}$ may be calculated. The maximum slope vector may be calculated by first taking the cross product of the surface normal vector $\vec{n}$ and the downward vector $\vec{z}$ to find a first vector that is normal to both surface normal vector $\vec{n}$ and downward vector $\vec{z}$. Then the maximum slope vector may be determined by taking the cross product between the first vector and the surface normal vector $\vec{n}$. After determining the maximum slope vector, the unit maximum slope vector may be determined by dividing the maximum slope vector by the maximum slope vector's magnitude to normalize the maximum slope vector. The unit maximum slope vector may then be calculated as follows:

$$\vec{s} = \frac{\vec{n} \times (\vec{n} \times \vec{z})}{\|\vec{n} \times (\vec{n} \times \vec{z})\|}$$

where $\vec{s}$ is the unit maximum slope vector from starting reference point 2080 to the next point 2083a is calculated. Additionally, the formula may be written in dot products instead of cross products for Example:

$$\vec{s} = (\vec{n} \cdot \vec{z})\vec{n} - (\vec{n} \cdot \vec{n})\vec{z} / \|(\vec{n} \cdot \vec{z})\vec{n} - (\vec{n} \cdot \vec{n})\vec{z}\|$$

Additive reference points 2081a (shown as six points in FIG. 5A without a support line connected to them) may be added to the slice 212a to create a density high enough to meet a threshold, along the slice 212a. In one embodiment, the larger the radius of curvature of the slice, the more precise the choice of z increment parameter needs to be.

FIG. 5B is a block diagram representation of a second iteration of constructing connecting support lines in the RTS 202 as shown in FIG. 5A. As depicted in FIG. 5B, a second slice 212a may be formed at an ending reference point 2083*a* that is positioned at a distance d in the z direction from a starting reference point 208. A support line 210 may then be constructed to intersect the starting reference point 2080 and the ending reference point 2083*a*, and intersect the first slice 212 and the second slice 212*a*. The support line 210 may run substantially parallel to the z direction. Additive reference points 2081*a* may be added to the second slice 212*a* to construct additional support lines 210. The construction of additional support lines 210 ensures that the density of support lines 210 does not drop below a density threshold.

Figure 6A:
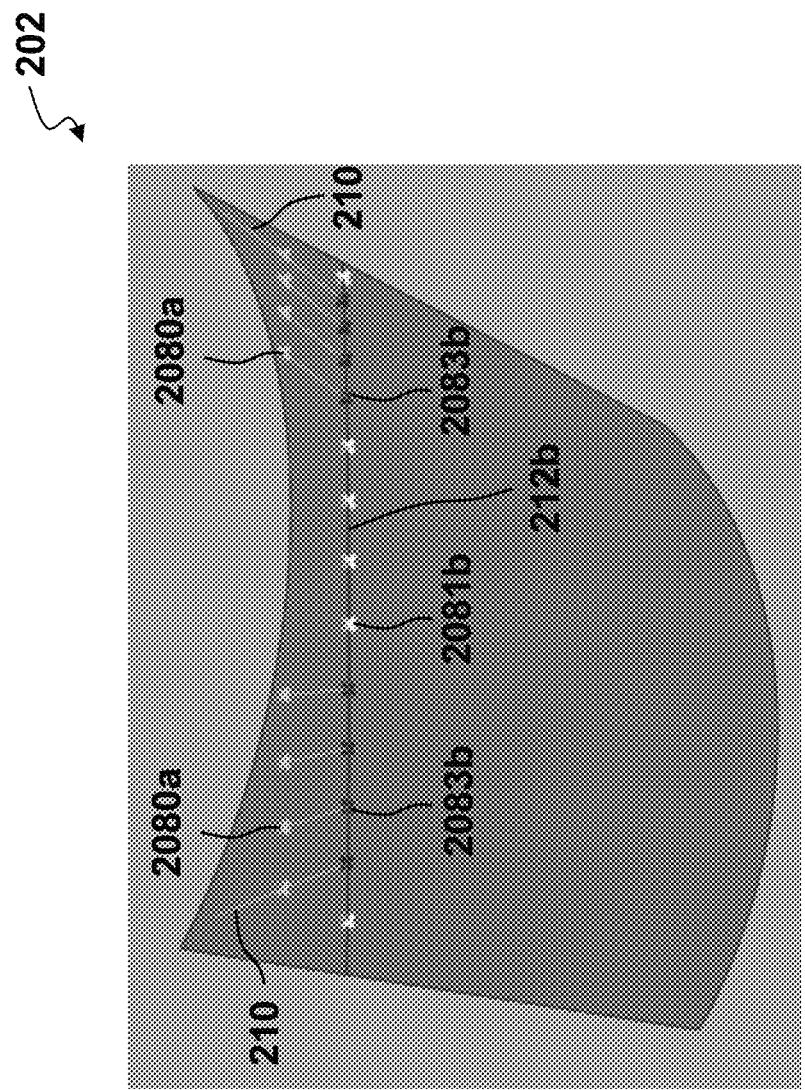
FIGS. 6A-6B respectively depict a graphical representation and a block diagram of a third iteration of constructing connecting support lines for forming the support structure to the support region of FIG. 3.
Figure 6B:
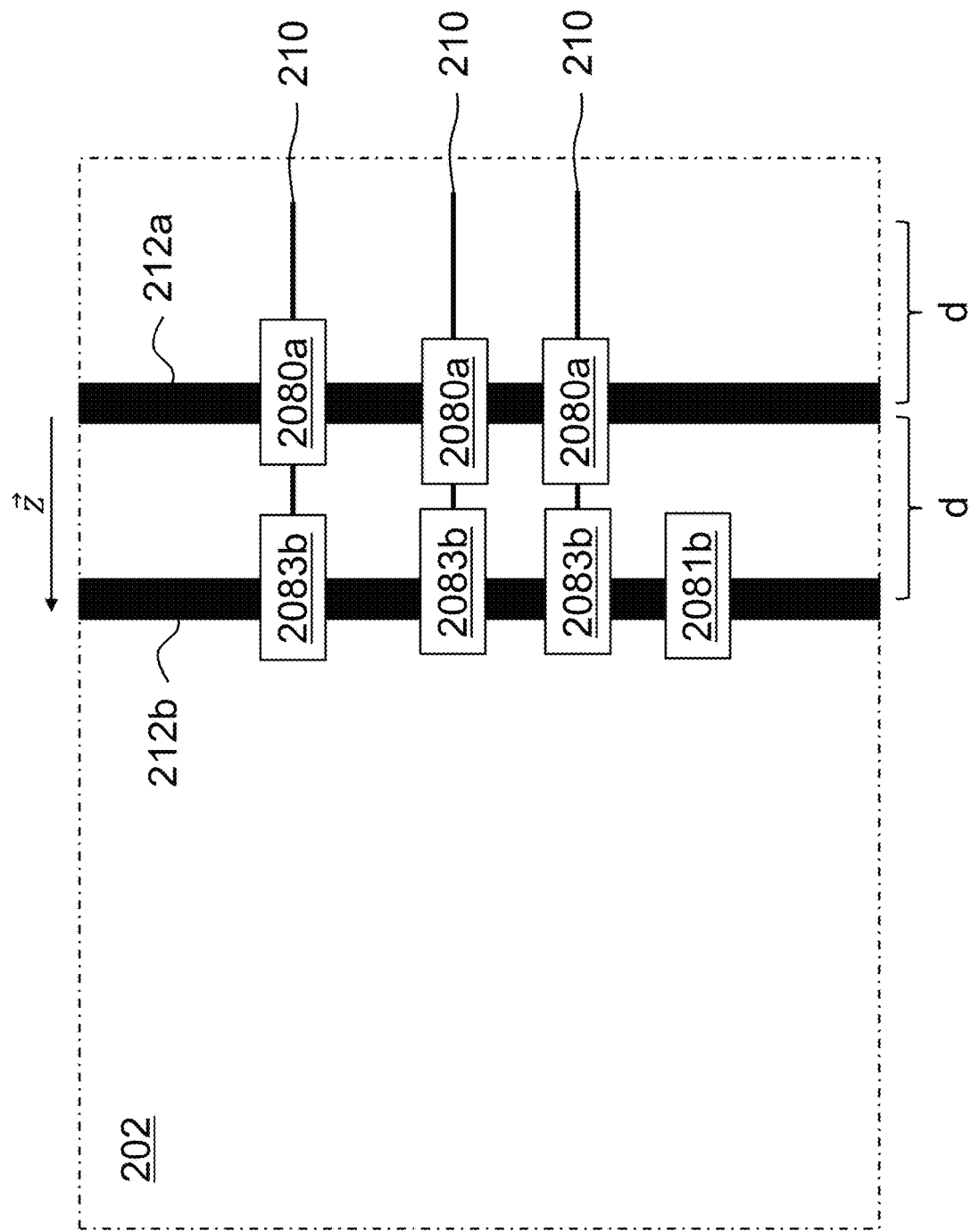

With respect to FIGS. 6A-6B, a new slice 212*b* may be iteratively added to the support structure 206, and once again distanced an increment d in the z direction from the previous slice 212*a* (FIG. 5A). In one embodiment, the slices may be added the same increment d every time and in other embodiments, the increment d may be different between slices. In one embodiment, the system may extend the support lines 210 between the starting reference point 2080*a* of the slice 212*a* and an ending reference point 2083*b* of the slice 212*b*. Each support line 210 connects the starting point 2080*a* of the slice 212*a* to associated ending point 2083*b* of the third slice 212*b*, with each support line 210 following the calculated maximum slope along the contour of the support structure 206. The slice 212*b* shows the extent of the prolongation of the lines 210. That is, in one embodiment, the slices may be parallel along z and the distance may be measured along z. Additive reference points 2081*b* (shown as six points in FIG. 6A without a support line connected to them) may be added to the slice 212*b* to create a density high enough to meet a threshold, along the slice 212*b*.

FIG. 6B is a block diagram representation of a second iteration of constructing connecting support lines in the RTS 202 as shown in FIG. 6A. A third slice 212*b* may be formed along ending reference points 2083*b* that are positioned at the distance d in the z direction from a corresponding starting reference point 2080*a*. The support line 210 may then be extended to intersect the starting reference points 2080 and their corresponding ending reference points 2083*b*, and intersect the second slice 212*a* and the third slice 212*b*. Additive reference points 2081*b* may also be added to the third slice 212*b* to construct additional support lines 210 for the previously described reasons in FIGS. 5A-B.

Figure 7A:
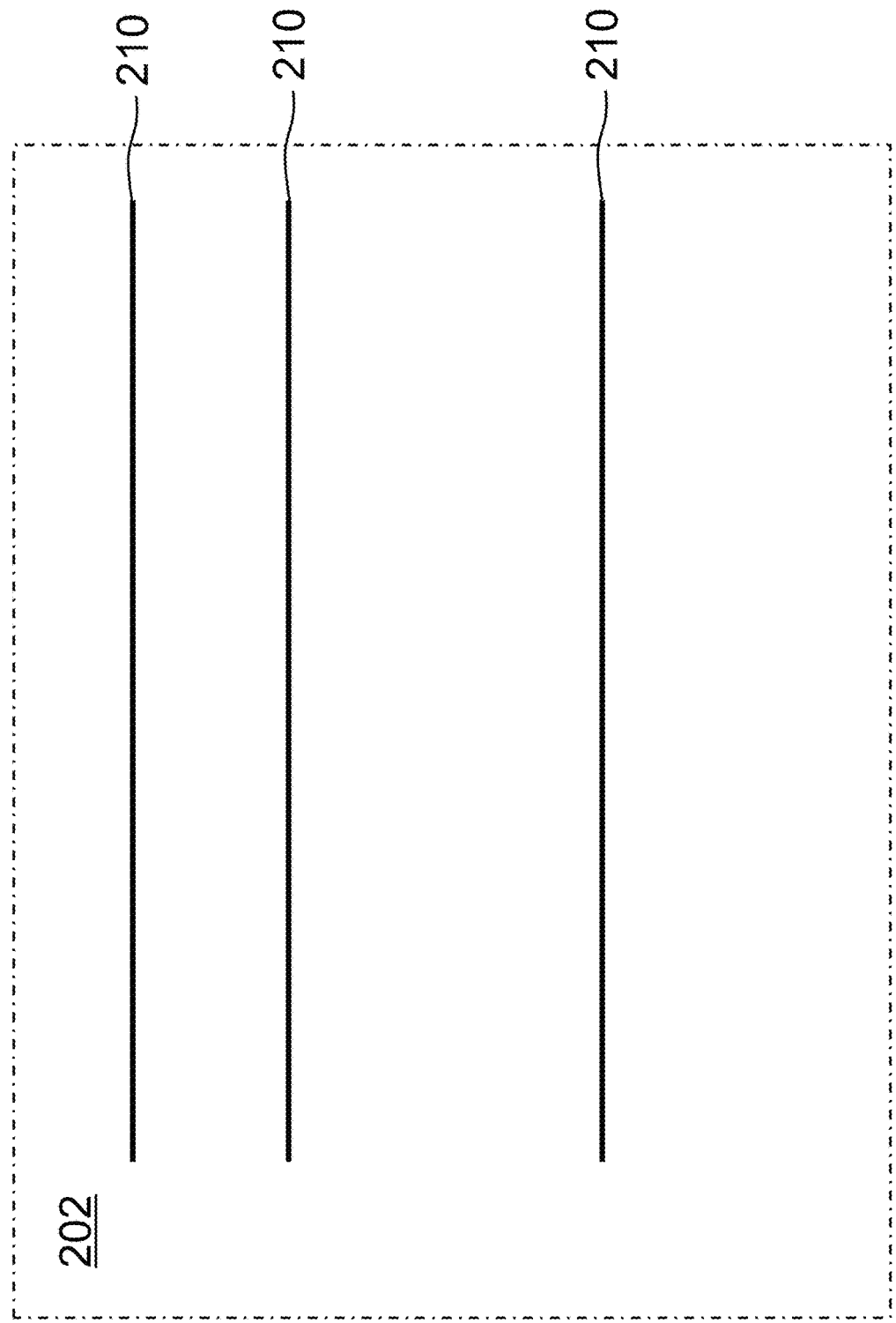
FIGS. 7A-7B depict a diagram with a set of support lines having a midpoint 214.
Figure 7B:
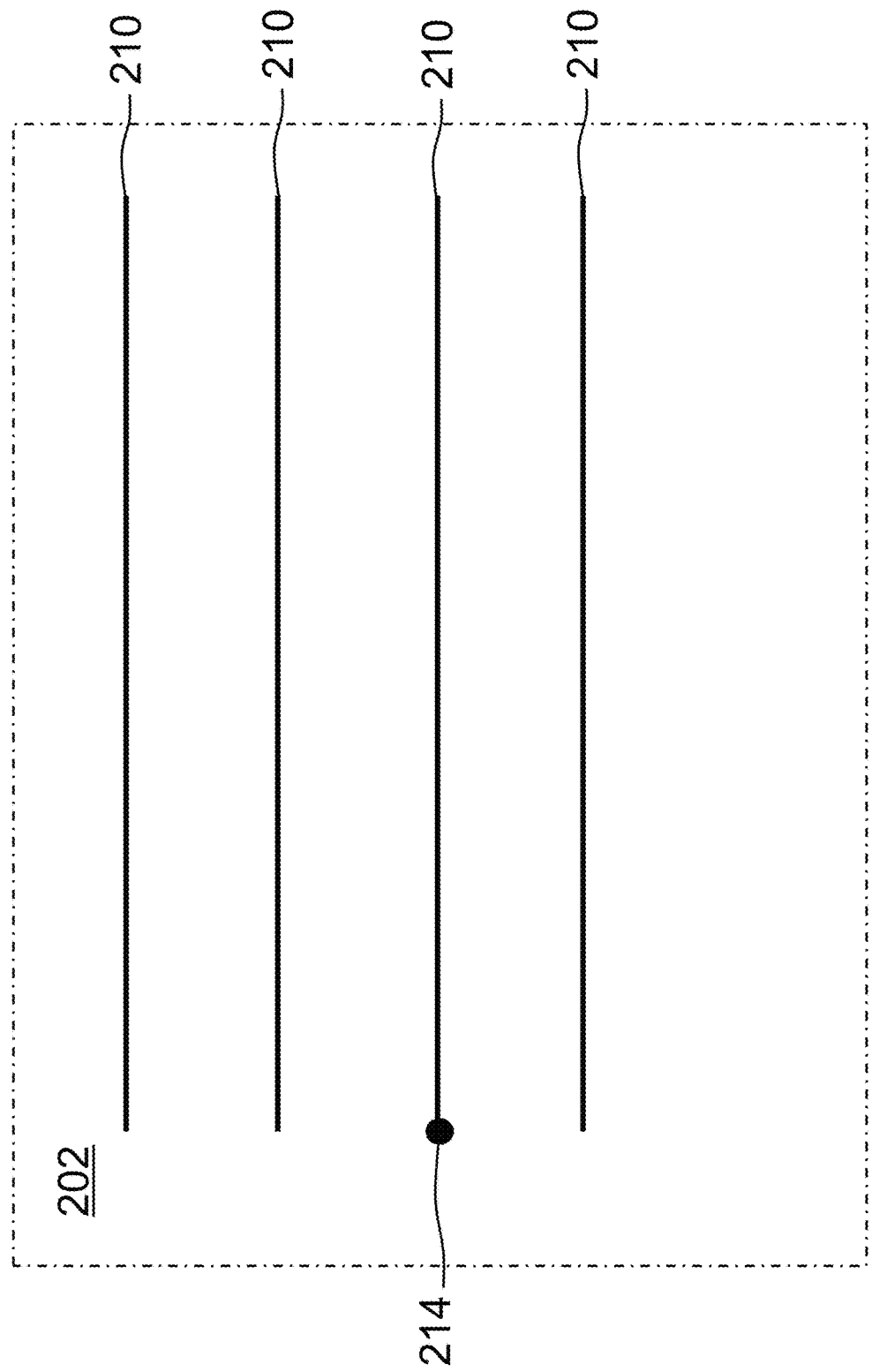

Referring to FIGS. 7A-7B, at each iteration of support line 210 prolongation, a density of lines 210 may be calculated. More specifically, along each line 210, the distance between each line 210 and the line's 210 nearest neighbor line is calculated along a given slice. Dividing the number of support lines 210 by the distance between said support lines 210 along the slice yields a density. In one embodiment, the density may be calculated at each iteration of prolongation of the lines 210. In one embodiment, the density increases as the lines 210 are iteratively extended toward the bottom of the RTS 202. In another embodiment, the density decreases as the lines 210 are iteratively extended toward the bottom of the RTS 202. As such, support lines may be interrupted or terminated to prevent the density from exceeding a maximum threshold density value defined by the user. If the density of lines 210 is above a threshold the support lines 210 may be caused to melt into each other due to thermal effects during manufacturing. Therefore, the density of lines 210 may be decreased according to some embodiments, if it is above the maximum threshold by interrupting a line, for example, line 210 at a point 2081*c* (see FIG. 8A).

In another embodiment, as depicted in FIG. 7B, if the lines 210 are below a minimum threshold density defined either by the user (e.g., the points are too far apart and exceed a threshold separation distance) or determined by the system, the distance between the adjacent points is divided in half and a new point may be put at that midpoint 214 between the lines 210. A new line 210 may then be inserted at that midpoint 214. In one embodiment, a machine learning algorithm may define the density based on previous construction of support structures.

In one embodiment, the maximum and minimum density thresholds are two parameters, where the maximum and minimum density threshold parameter values may be defined by the user or determined by the system based on prior obtained information from previously executed processes. Therefore, the number of lines for the support structure 206 may be adjusted or "fine-tuned" based on the maximum and minimum density threshold parameter values set, with each iteration. In one embodiment, determining a minimal density may be based on the part and preventing any warping in the part. This may be determined by simulation or some experimentation. In one embodiment, the maximum density may be based on melting support together as described herein.

Figure 8A:
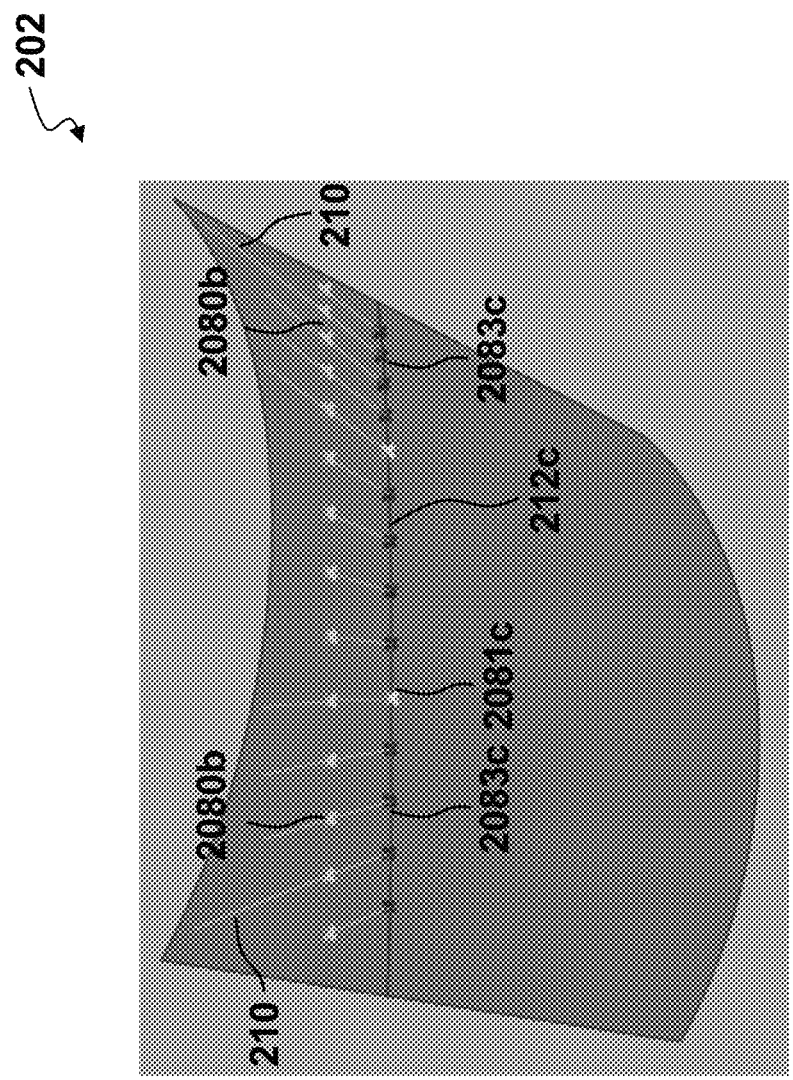
FIGS. 8A-8B respectively depict a graphical representation and a block diagram of a fourth iteration of constructing connecting support lines for forming the support structure to the support region of FIG. 3.
Figure 8B:
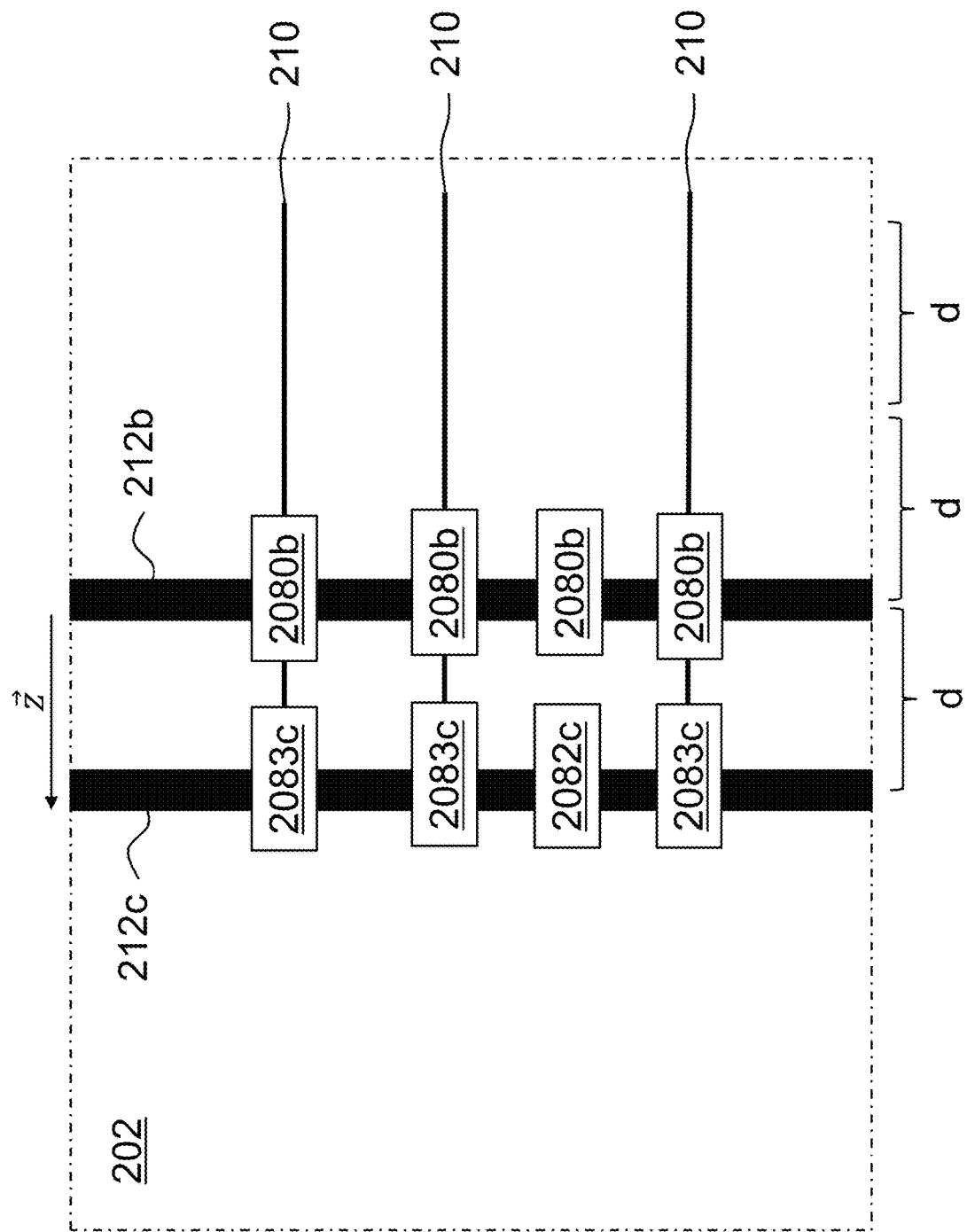

In one example embodiment, and with reference to FIGS. 8A-8B, a new slice 212*c* has been iteratively added in the same manner as the previous slices 212, 212*a*, 212*b*. Once again, the system may extend the support line 210 between a starting reference point 2080*b* of the slice 212*b* and an ending reference point 2083*c* of the slice 212*c*. The support line 210 follows the maximum slope vector along the RTS 202 in three dimensions. Subtractive reference points 2082*c* indicate that the support line 210 may be terminated at this point. This is because the calculated density has exceeded a density threshold value. Therefore, just as reference points may be added to a slice to increase the density above a minimum threshold density, such as additive reference points 2081*a* (see FIG. 4A) and additive reference points 2081*b* (see FIG. 6A), reference points may be removed in order to terminate a support line 210 and decrease the density below a threshold maximum density.

FIG. 8B is a block diagram representation of a third iteration of constructing connecting support lines in the RTS 202 as shown in FIG. 8A. A fourth slice 212*c* may be formed along ending reference points 2083*c* that are positioned at the distance d in the z direction from a corresponding starting reference point 2080*b*. The support line 210 may then be extended to intersect ending reference point 2083*c* and their corresponding starting reference points 2080*b*, and intersect the third slice 212*b* and the fourth slice 212*c*. Support lines 210 may be removed at subtractive reference points 2182*c* to ensure the density of support lines 210 does not exceed a density threshold.

Figure 9A:
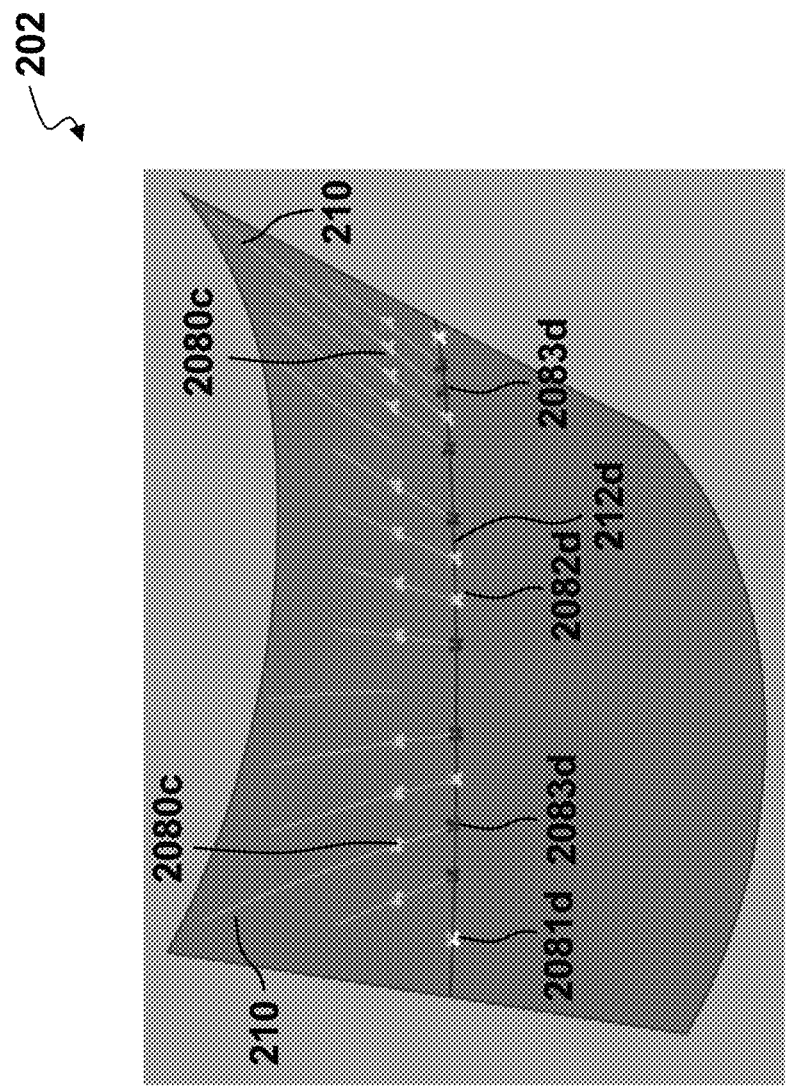
FIGS. 9A-9B respectively depicts a graphical representation and a block diagram of a fifth iteration of constructing connecting support lines for forming the support structure to the support region of FIG. 3.
Figure 9B:
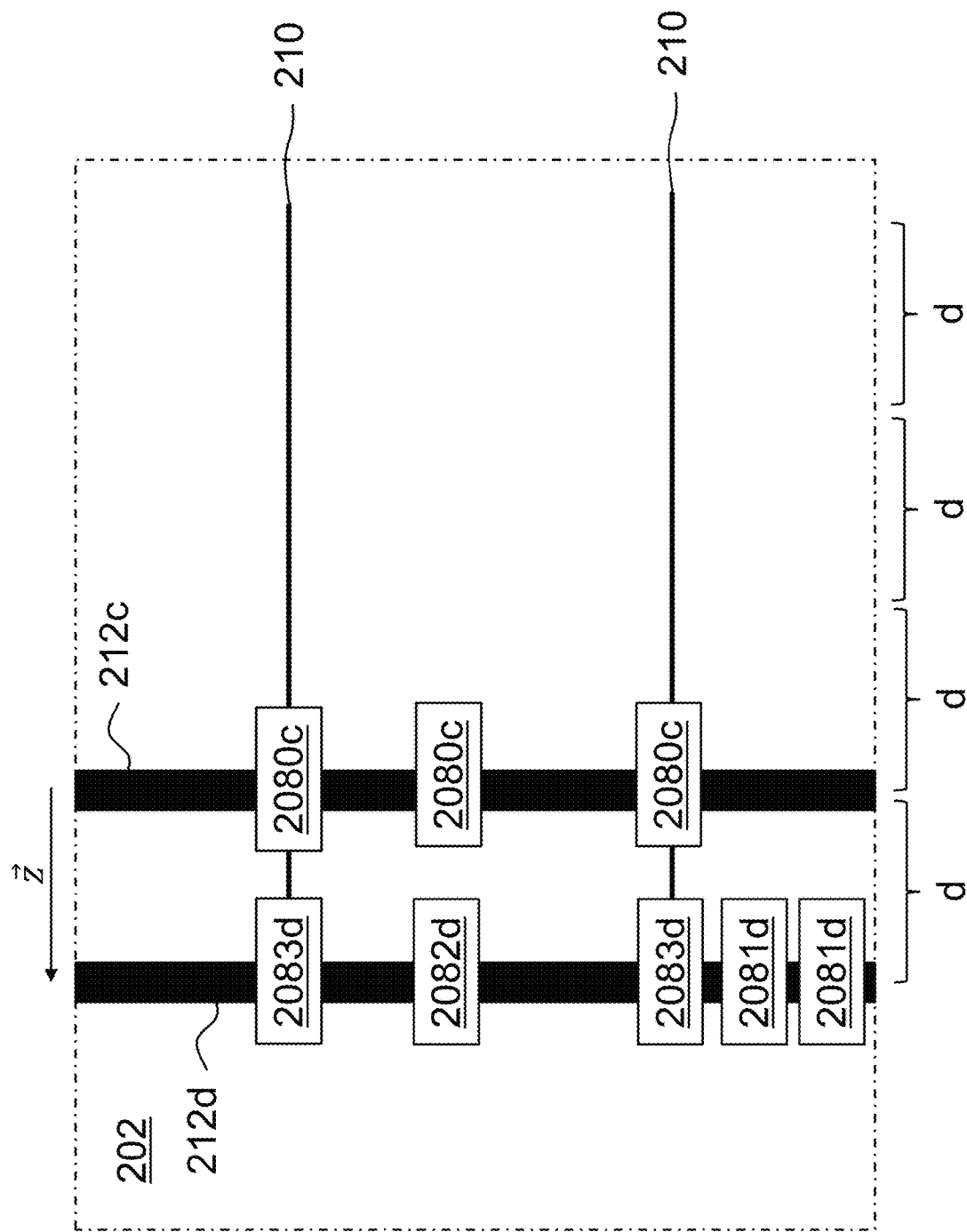

With respect to FIGS. 9A-9B, a slice 212*d* has been iteratively added, and the support lines 210 may be seen terminated at the subtractive reference points 2082*c* in the previous FIG. 7A. The slice 212*d* is distanced the increment d in the z direction from the previous slice 212*c*, and the system may extend the support lines 210 between the starting reference point 2080*c* of the slice 212*c* and an ending reference point 2083*d* of the slice 212*d*. Each support line 210 connects the starting point 2080*c* of the slice 212*c* to the associated ending point 2083*d* of the fourth slice 212*d*, with each support line 210 following the calculated maximum slope along the RTS 202. The slice 212*d* shows the extent of the prolongation of the lines 210. Additional additive reference points 2081*d* are added to increase the density along the slice 212*d* in that particular region; therefore adding a new support line 210 between that point and a subsequent reference point of the proceeding iteration. Conversely, subtractive reference points 2082d (previously determined in FIG. 8A) are removed to decrease the density along the slice 212d in that particular region; therefore, terminating the support line 210 at that reference point.

Referring specifically to FIG. 9B, a block diagram representation of a fourth iteration of constructing connecting support lines in the RTS 202 as shown in FIG. 9A, is illustrated. A fifth slice 212d may be formed at an ending reference point 2083d that is positioned at the distance d in the z direction from the corresponding starting reference point 2080c. The support line 210 may then be extended to intersect the starting reference point 2080c and the ending reference point 2083d, and intersect the fourth slice 212c and the fifth slice 212d. Additive reference points 2081d may be added to increase the density of support lines 210 in one section of the RTS 202, and subtractive reference points 2082d may be used to decrease the density of support lines in a different section of the RTS 202.

Figure 10:
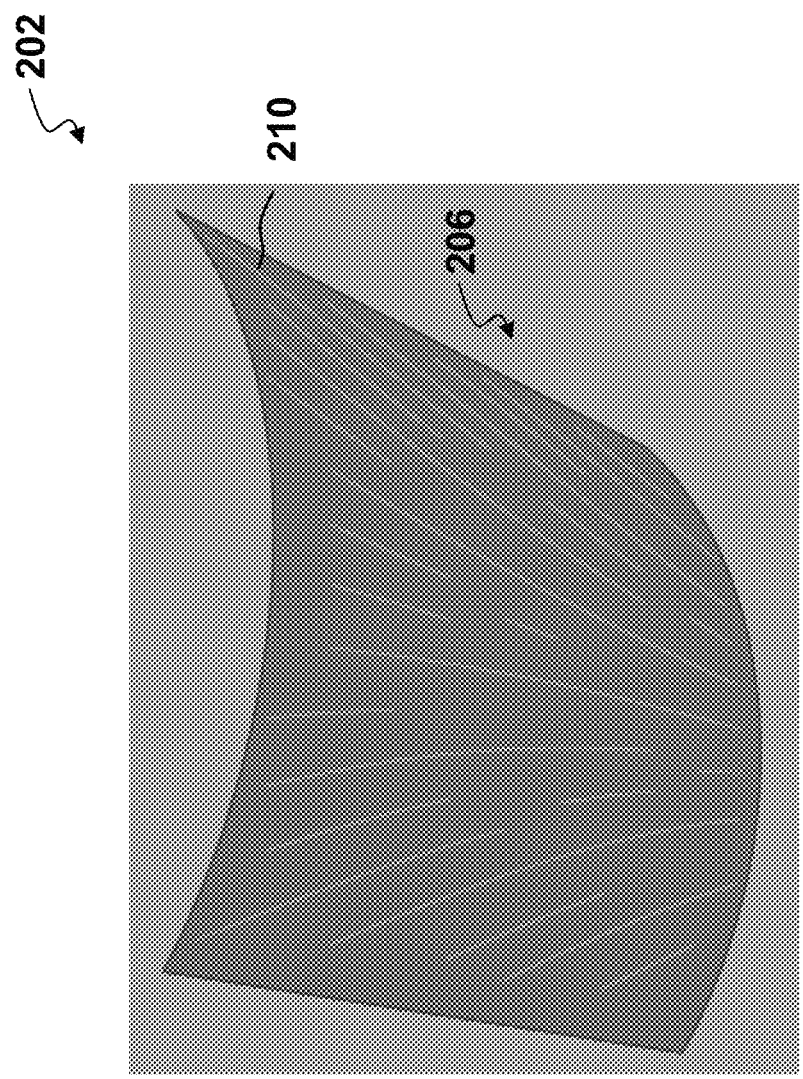
FIG. 10 depicts a graphical representation of the final set of connecting support lines forming the support structure to the region to support shown in FIG. 3.
Figure 11:
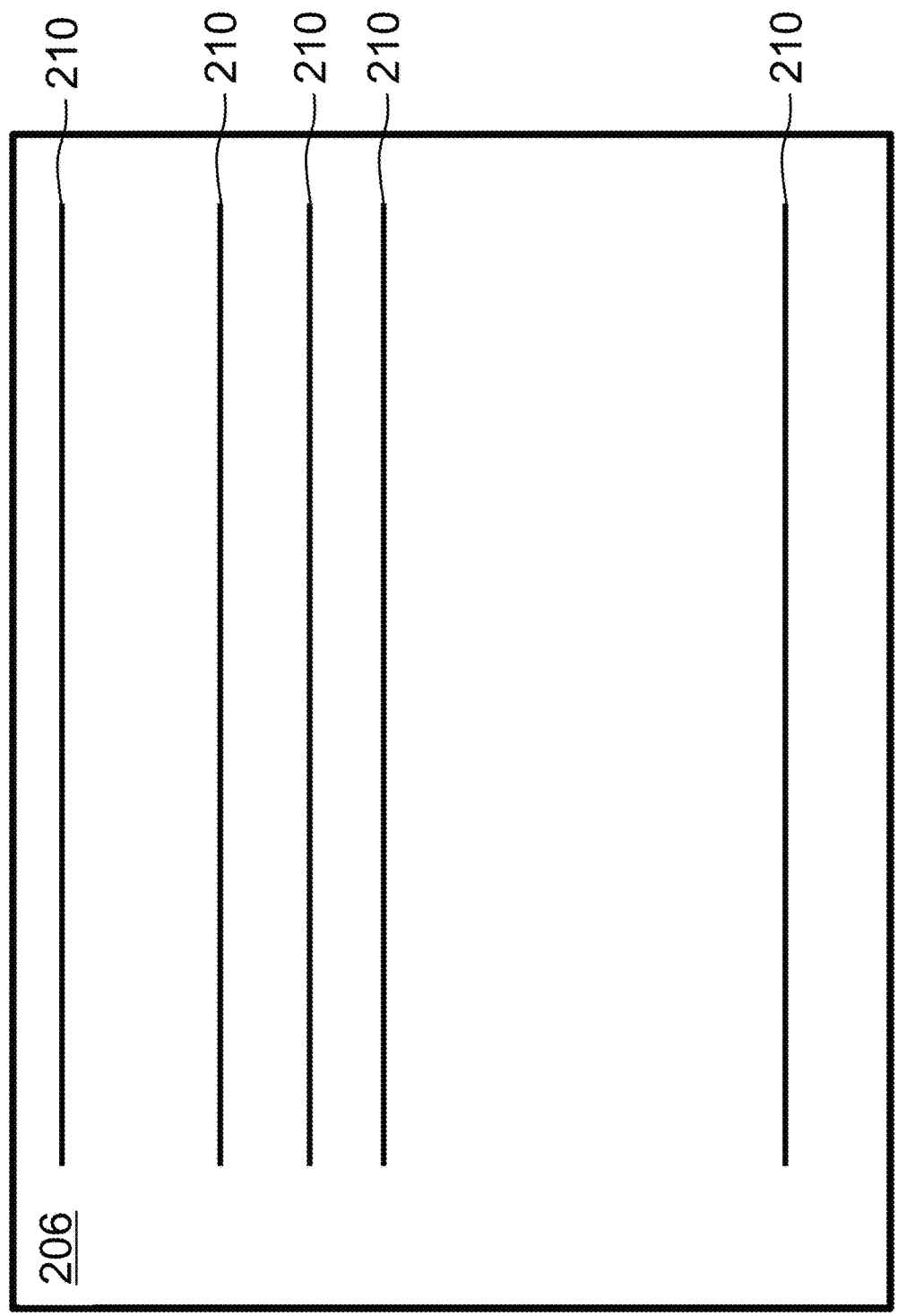
FIG. 11 depicts an uneven density of support lines.

With respect to FIG. 10, the final support structure 206 of the RTS 202 has been constructed after additional iterations. The full three-dimensional support structure 206 is shown in FIG. 2. FIG. 10 and FIG. 11 illustrate that the density of the lines 210 decreases in some areas of the support structure 206 (e.g., the lines 210 get farther apart in some areas) in order to maintain a certain density of support. Conversely, the density of the lines 210 increases in some areas of the support structure 206 (e.g., the lines 210 get closer together in some areas) in order to maintain a certain density of support. In one embodiment, the user may adjust the maximum and minimum density threshold parameter values, such that a lower density of support is desired for the support structure 206. More specifically, as the support lines 210 are extended to follow the maximum slope along each line, the density may be calculated between adjacent lines 210.

In another embodiment, the maximum and minimum density threshold parameter values may be automatically determined by the computing device 120 based on the maximum and minimum density threshold parameter values associated with a large number of manufactured support structures 206.

Figure 12:
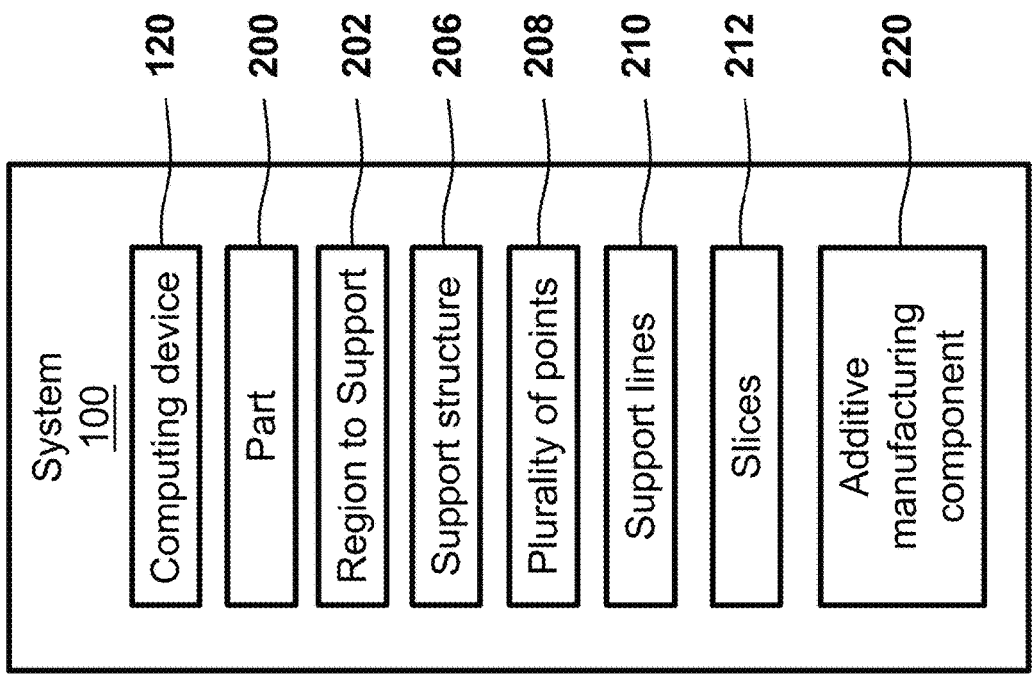
FIG. 12 depicts a high-level block diagram of the present system.

FIG. 12 is a high-level block diagram of the present system 100. The present system 100 includes a computing device 120, a part 200, a region to support 202, a support structure 206, a plurality of points 208, support lines 210, slices 212, and an additive manufacturing component 220. The computing device 120 may direct the additive manufacturing component 220 to construct slices 212 at a region to support (RTS) 202. The slices 212 may be constructed along a plurality of points 208 positioned on the RTS 202. The slices 212 may be intersected by support lines 210. The support lines 210 may be used by the computing device to determine whether a specific section of the RTS 202 meets a required density threshold.

Figure 13:
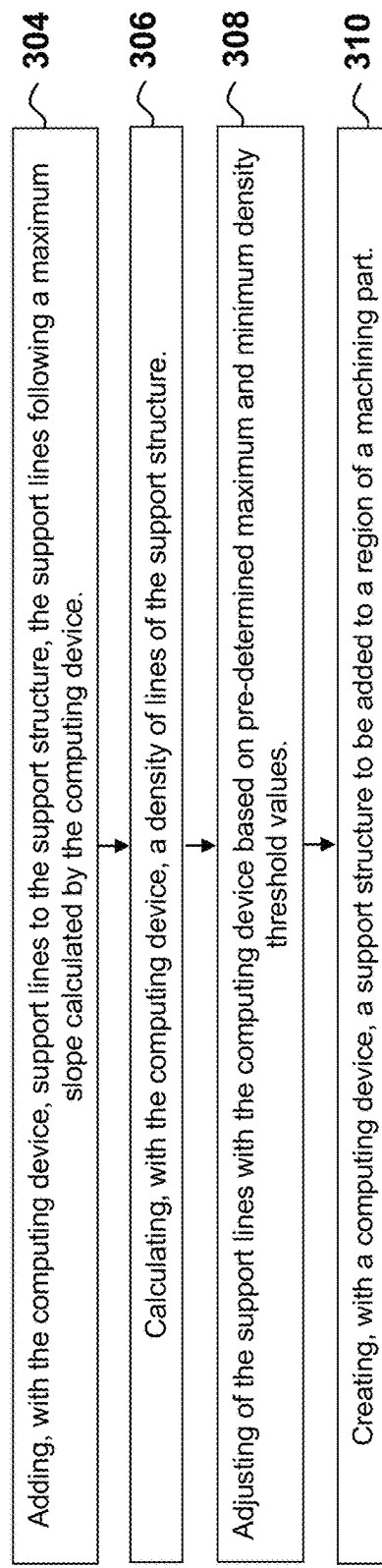
FIG. 13 depicts a flow chart of a method for determining a position of support lines for connecting a support structure and a region to support.

With respect to FIG. 13, a flow chart of a method 300 for determining a position of support lines for connecting a support structure and a region to support the part is shown. In one embodiment, the region to support may be related to the region of the part surface that needs to be connected to the support structure. In one embodiment, the region may have a particular geometry. At step 304, the user may add, with the computing device, support lines to the support structure, where the support lines following a maximum slope along the contour of each line calculated by the computing device.

Along each contour of the supporting lines, the computing device may calculate the density of support lines of the support structure, at step 306. More specifically, the user may extend the support lines along the surface of the region of support by extending the spatial length of the lines, such that the lines follow the maximum slope. At each step of prolongation, the density of lines may be calculated. More specifically, along each line, the distance between each line and the line's nearest neighbor line is calculated in the horizontal plane, e.g., "slice" of the surface of the region of support. The distance between adjacent points divided by the number of lines gives the (number) density of lines in the region.

At step 308, the support lines may be adjusted or fine-tuned with the computing device based on pre-determined maximum and minimum density threshold values. In one embodiment, the density threshold values are defined by a user. In another embodiment, the density threshold values are determined by the computing device based on density threshold values from prior-machined support structures. That is, a machine learning technique based on similar additive manufacturing machines and parameters used in similar manufactured parts. In one embodiment, if the lines are above a maximum threshold density (e.g., the points are too close together and are below a threshold separation distance) the user or computing device may terminate the line. In another embodiment, if the lines are below a minimum threshold density (e.g., the points are too far apart and exceed a threshold separation distance), the distance between the adjacent points is divided in half and a new point may be put at that midpoint between the lines. A new line may then be inserted at that midpoint. At step 310, a new support structure to be added to a region of support of a part may be generated based on the previous steps.

The maximum and minimum density thresholds are two parameters, where the maximum and minimum density threshold parameter values may be pre-determined, such as by the user, or determined dynamically by the computing device. Therefore, the number of lines for the support structure may be adjusted based on the maximum and minimum density threshold parameter values set by the user. For example, a line may be terminated or a line may be added based on the calculated density and whether or not the line is above or below a density threshold value. The density of the lines may be decreased in some areas of the support structure (e.g., the lines get farther apart in some areas) in order to maintain a certain density of support. Conversely, the density of the lines increases in some areas of the support structure (e.g., the lines get closer together in some areas) in order to maintain a certain density of support. The density of the lines (e.g., higher line density vs. lower line density) may be determined based on a number of parameters, for example, the volume of melted material above the RTS. In another embodiment, the density may be determined by executing simulation designed to provide a realistic imitation of the operation of additive manufacturing process.

Figure 14A:
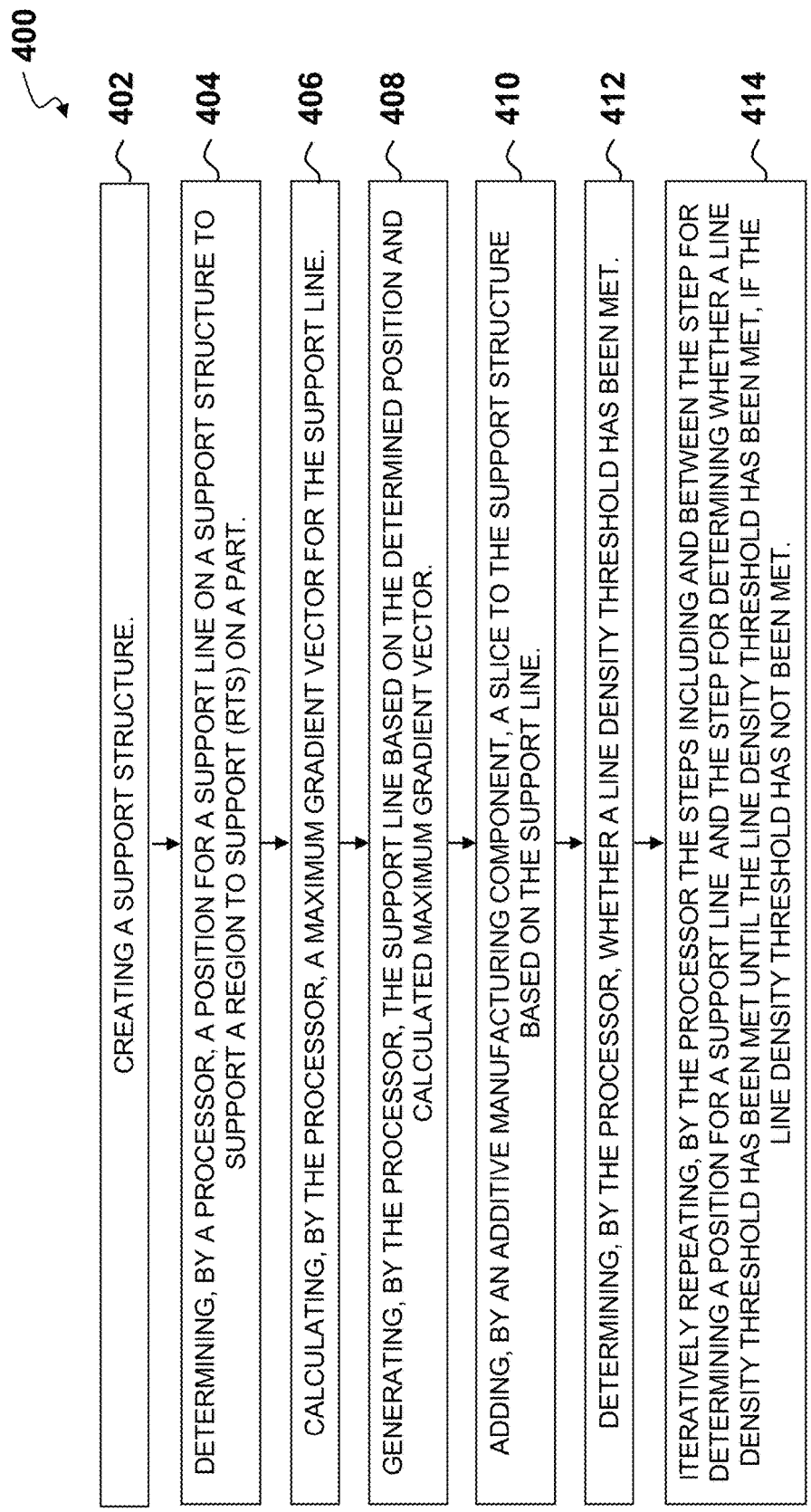
FIG. 14A depicts a flow chart of a method for generating slices between a support structure and a region to support.

FIG. 14A is a flow chart of a method 400 for adding slices between a support structure and a region to support. The method 400 may begin with a step 402 for creating a support structure. The method 400 may then have a step 404 for determining a position for a support line on a support structure to support a region to support (RTS) on a part. The method 400 may then have a step 406 for calculating a maximum gradient vector for the support line. The method 400 may then have a step 408 for generating the support line based on the determined position and calculated maximum gradient vector. The method 400 may then have a step 410 for adding a slice to the support structure based on the support line. The method 400 may then have a step 412 for determining whether a line density threshold has been met. The method 400 may then have a step 414 for iteratively repeating steps from step 404 to step 412 until the line density threshold has been met, if the line threshold has not been met.

Figure 14B:
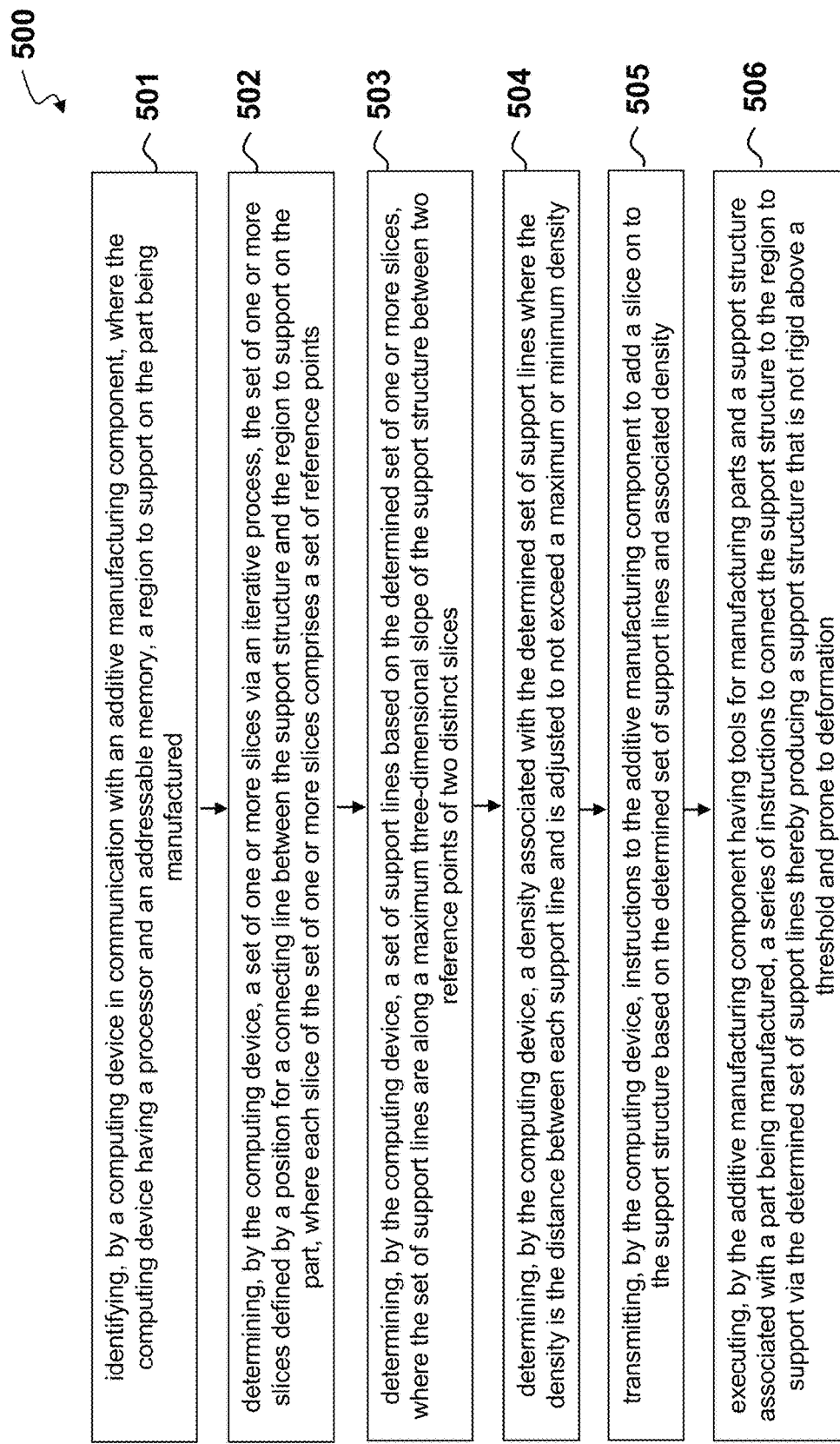
FIG. 14B depicts a flow chart of a method for the enclosed embodiments.

FIG. 14B is a flow chart of a method 500 for determining support structures in additive manufacturing as disclosed herein. Method embodiments may include: identifying, by a computing device in communication with an additive manufacturing component, where the computing device having a processor and an addressable memory, a region to support on the part being manufactured (step 501); determining, by the computing device, a set of one or more slices via an iterative process, the set of one or more slices defined by a position for a connecting line between the support structure and the region to support on the part, where each slice of the set of one or more slices comprises a set of reference points (step 502); determining, by the computing device, a set of support lines based on the determined set of one or more slices, where the set of support lines are along a maximum three-dimensional slope of the support structure between two reference points of two distinct slices (step 503); determining, by the computing device, a density associated with the determined set of support lines where the density may be the distance between each support line and may be adjusted to not exceed a maximum or minimum density (step 504); and transmitting, by the computing device, instructions to the additive manufacturing component to add a slice on to the support structure based on the determined set of support lines and associated density (step 505); and executing, by the additive manufacturing component having tools for manufacturing parts and a support structure associated with a part being manufactured, a series of instructions to connect the support structure to the region to support via the determined set of support lines thereby producing a support structure that is not rigid above a threshold and prone to deformation (step 506).

Figure 15:
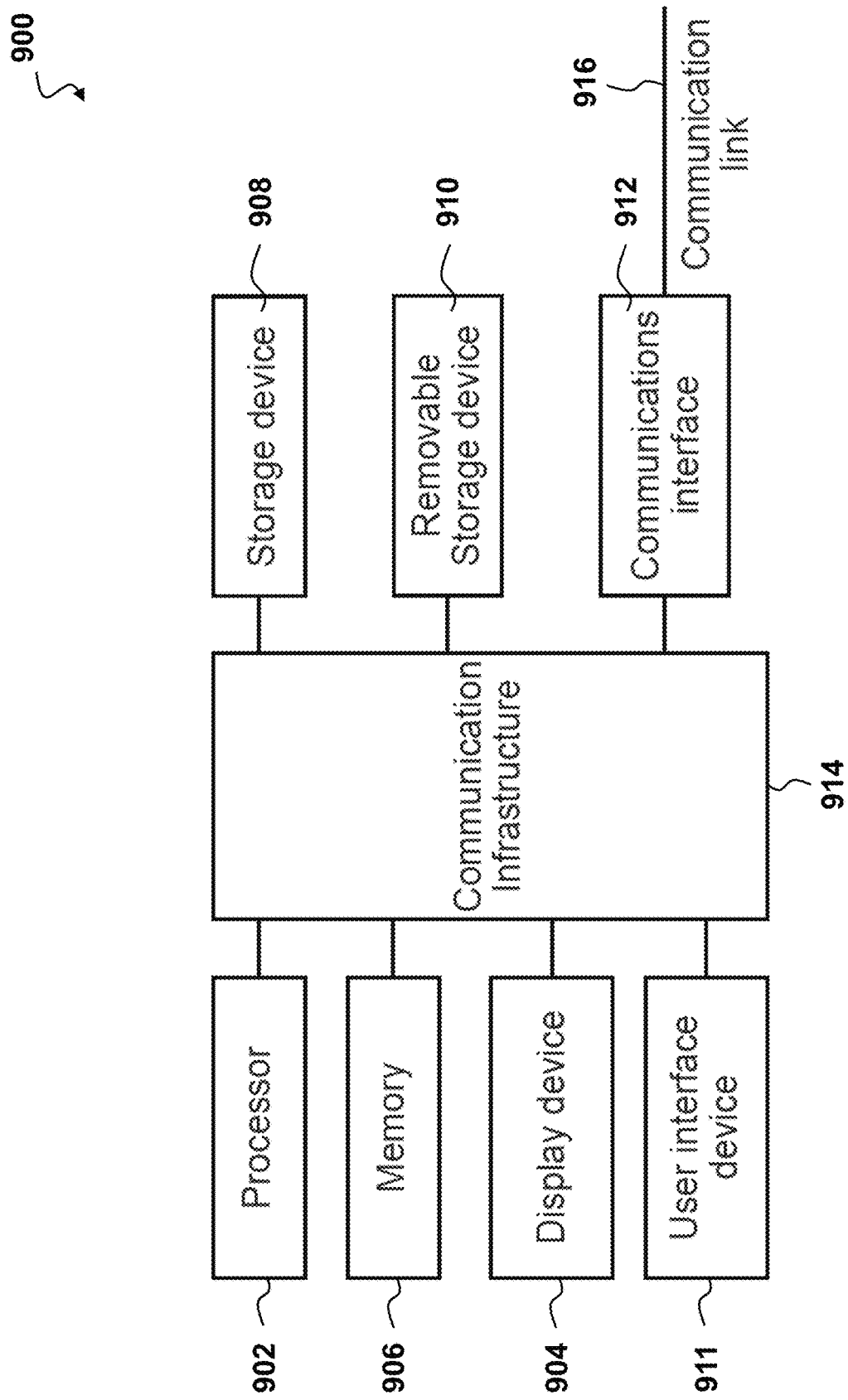
FIG. 15 shows a high-level block diagram and process of a computing system for implementing an embodiment of the system and process.

FIG. 15 is a high-level block diagram 900 showing a computing system comprising a computer system useful for implementing an embodiment of the system and process, disclosed herein. Embodiments of the system may be implemented in different computing environments. The computer system includes one or more processors 902, and can further include an electronic display device 904 (e.g., for displaying graphics, text, and other data), a main memory 906 (e.g., random access memory (RAM)), storage device 908, a removable storage device 910 (e.g., removable storage drive, a removable memory module, a magnetic tape drive, an optical disk drive, a computer readable medium having stored therein computer software and/or data), user interface device 911 (e.g., keyboard, touch screen, keypad, pointing device), and a communication interface 912 (e.g., modem, a network interface (such as an Ethernet card), a communications port, or a PCMCIA slot and card). The communication interface 912 allows software and data to be transferred between the computer system and external devices. The system further includes a communications infrastructure 914 (e.g., a communications bus, cross-over bar, or network) to which the aforementioned devices/modules are connected as shown.

Information transferred via communications interface 914 may be in the form of signals such as electronic, electromagnetic, optical, or other signals capable of being received by communications interface 914, via a communication link 916 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 912. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 16:
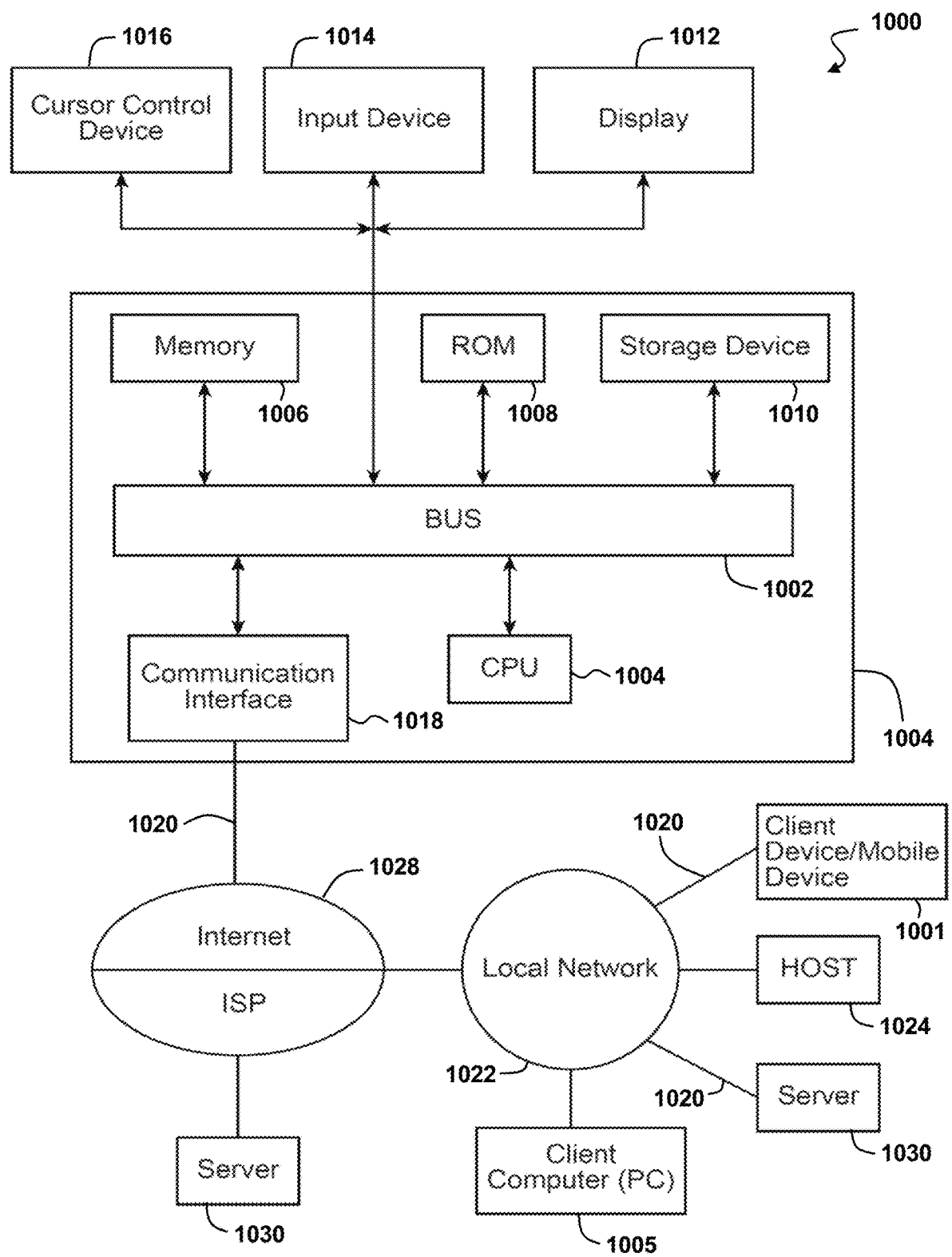
FIG. 16 shows a block diagram and process of an exemplary system in which an embodiment may be implemented.

FIG. 16 shows a block diagram of an example system 1000 in which an embodiment may be implemented. The system 1000 includes one or more client devices 1001 such as consumer electronics devices, connected to one or more server computing systems 1030. A server 1030 includes a bus 1002 or other communication mechanism for communicating information, and a processor (CPU) 1004 coupled with the bus 1002 for processing information. The server 1030 also includes a main memory 1006, such as a random access memory (RAM) or other dynamic storage device, coupled to the bus 1002 for storing information and instructions to be executed by the processor 1004. The main memory 1006 also may be used for storing temporary variables or other intermediate information during execution or instructions to be executed by the processor 1004. The server computer system 1030 further includes a read only memory (ROM) 1008 or other static storage device coupled to the bus 1002 for storing static information and instructions for the processor 1004. A storage device 1010, such as a magnetic disk or optical disk, is provided and coupled to the bus 1002 for storing information and instructions. The bus 1002 may contain, for example, thirty-two address lines for addressing video memory or main memory 1006. The bus 1002 can also include, for example, a 32-bit data bus for transferring data between and among the components, such as the CPU 1004, the main memory 1006, video memory and the storage 1010. Alternatively, multiplex data/address lines may be used instead of separate data and address lines.

The server 1030 may be coupled via the bus 1002 to a display 1012 for displaying information to a computer user. An input device 1014, including alphanumeric and other keys, is coupled to the bus 1002 for communicating information and command selections to the processor 1004. Another type or user input device comprises cursor control 1016, such as a mouse, a trackball, or cursor direction keys for communicating direction information and command selections to the processor 1004 and for controlling cursor movement on the display 1012.

According to one embodiment, the functions are performed by the processor 1004 executing one or more sequences of one or more instructions contained in the main memory 1006. Such instructions may be read into the main memory 1006 from another computer-readable medium, such as the storage device 1010. Execution of the sequences of instructions contained in the main memory 1006 causes the processor 1004 to perform the process steps described herein. One or more processors in a multi-processing arrangement may also be employed to execute the sequences of instructions contained in the main memory 1006. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product" are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1004 for execution. Such a medium may take many forms, including but not limited to, non-volatile media, volatile media, and transmission media. Non-volatile media includes, for example, optical or magnetic disks, such as the storage device 1010. Volatile media includes dynamic memory, such as the main memory 1006. Transmission media includes coaxial cables, copper wire and fiber optics, including the wires that comprise the bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1004 for execution. For example, the instructions may initially be carried on a magnetic disk of a remote computer. The remote computer can load the instructions into its dynamic memory and send the instructions over a telephone line using a modem. A modem local to the server 1030 can receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1006, from which the processor 1004 retrieves and executes the instructions. The instructions received from the main memory 1006 may optionally be stored on the storage device 1010 either before or after execution by the processor 1004.

The server 1030 also includes a communication interface 1018 coupled to the bus 1002. The communication interface 1018 provides a two-way data communication coupling to a network link 1020 that is connected to the world wide packet data communication network now commonly referred to as the Internet 1028. The Internet 1028 uses electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

In another embodiment of the server 1030, interface 1018 is connected to a network 1022 via a communication link 1020. For example, the communication interface 1018 may be an integrated services digital network (ISDN) card or a modem to provide a data communication connection to a corresponding type of telephone line, which can comprise part of the network link 1020. As another example, the communication interface 1018 may be a local area network (LAN) card to provide a data communication connection to a compatible LAN. Wireless links may also be implemented. In any such implementation, the communication interface 1018 sends and receives electrical electromagnetic or optical signals that carry digital data streams representing various types of information.

The network link 1020 typically provides data communication through one or more networks to other data devices. For example, the network link 1020 may provide a connection through the local network 1022 to a host computer 1024 or to data equipment operated by an Internet Service Provider (ISP). The ISP in turn provides data communication services through the Internet 1028. The local network 1022 and the Internet 1028 both use electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

The server 1030 can send/receive messages and data, including e-mail, program code, through the network, the network link 1020 and the communication interface 1018. Further, the communication interface 1018 can comprise a USB/Tuner and the network link 1020 may be an antenna or cable for connecting the server 1030 to a cable provider, satellite provider or other terrestrial transmission system for receiving messages, data and program code from another source.

The example versions of the embodiments described herein may be implemented as logical operations in a distributed processing system such as the system 1000 including the servers 1030. The logical operations of the embodiments may be implemented as a sequence of steps executing in the server 1030, and as interconnected machine modules within the system 1000. The implementation is a matter of choice and can depend on performance of the system 1000 implementing the embodiments. As such, the logical operations constituting said example versions of the embodiments are referred to for e.g., as operations, steps or modules.

Similar to a server 1030 described above, a client device 1001 can include a processor, memory, storage device, display, input device and communication interface (e.g., e-mail interface) for connecting the client device to the Internet 1028, the ISP, or LAN 1022, for communication with the servers 1030.

The system 1000 can further include computers (e.g., personal computers, computing nodes) 1005 operating in the same manner as client devices 1001, where a user can utilize one or more computers 1005 to manage data in the server 1030.

Figure 17:
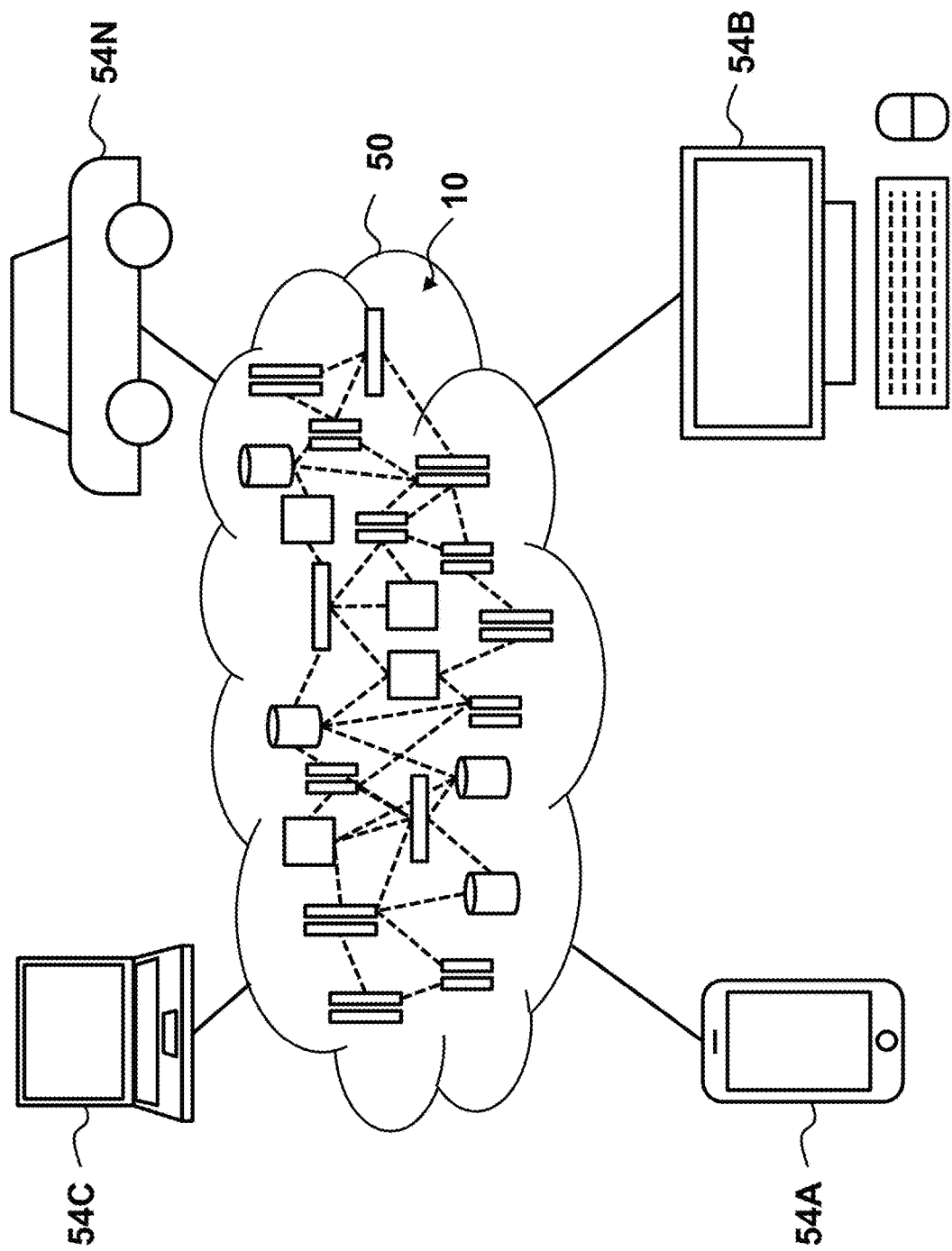
FIG. 17 depicts a cloud computing environment for implementing an embodiment of the system and process disclosed herein.

Referring now to FIG. 17, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
    an additive manufacturing component having tools for manufacturing a part and a support structure associated with the part being manufactured;
    a computing device in communication with the additive manufacturing component, wherein the computing device having a processor and an addressable memory, is configured to:
    identify a region to support on the part being manufactured;
    determine a set of one or more slices, via an iterative process, on the region to support on the part, wherein each slice of the set of one or more slices comprises a set of reference points;
    determine, during each iteration of the iterative process, a position for each reference point of the set of reference points on a current slice based on a maximum gradient vector associated with the position of a reference point on a previously determined slice, wherein the maximum gradient vector is along a maximum three-dimensional slope of the support structure;
    determine, during each iteration of the iterative process, a set of support lines based on the determined position of each reference point of the set of reference points on the current slice and each reference point of the set of reference points on the previously determined slice of the set of one or more slices, wherein the set of support lines are between two reference points of two distinct slices of the set of one or more slices;
    determine, during each iteration of the iterative process, a density associated with the determined set of support lines on the region to support, wherein the density is determined based on comparing a distance between each support line with adjacent support lines of the set of support lines;
    adjust, during each iteration of the iterative process, the determined set of support lines based on the determined density associated with the determined set of support lines falling in a range of a minimum density and a maximum density via addition of at least one new reference point to start a new support line to add to the set of support lines and removal of at least one reference point from the set of reference points to terminate a support line; and
    transmit instructions to the additive manufacturing component based on the determined and adjusted set of support lines; and
    wherein the additive manufacturing component is configured to execute a series of instructions to connect the support structure to the region to support based on the transmitted instructions, and
    wherein the maximum three-dimensional slope of the maximum gradient vector is calculated by first taking the cross product of a surface normal vector $\vec{n}$ at the position of the reference point on the previously determined slice and the downward vector $\vec{z}$ to find a first vector and then taking the cross product between the first vector and the surface normal vector $\vec{n}$.

2. The system of claim 1 wherein at each iteration of the determination of the set of support lines, a density of the set of support lines is calculated.

3. The system of claim 2 wherein at each iteration of the determination of the set of support lines, along each support line, the distance between each reference point associated with each support line and nearest neighbor reference point associated with each support line of the set of support lines is calculated along a given slice of the set of one or more slices.

4. The system of claim 3 wherein at each iteration of the determination of the set of support lines, support lines are terminated to prevent the density from exceeding the maximum density.

5. The system of claim 4 wherein each slice comprises at least one reference point, and one or more adjacent reference points are removed in order to decrease the density below the maximum density.

6. The system of claim 3 wherein at each iteration of the determination of the set of support lines, if the density is below the minimum density, the distance between adjacent reference points on at least a pair of adjacent support lines of the set of support lines is divided in half and a new reference point is created at that midpoint between the support lines.

7. The system of claim 6 wherein each slice comprises at least one reference point and a set of one or more reference points are added to a slice to increase the density above the minimum density.

8. The system of claim 1 wherein the set of support lines are further determined by calculating a maximum gradient vector for each support line of the set of support lines.

9. The system of claim 1 wherein region to support is defined by an angle that the surface of the region to support subtends relative to the (negative) z direction.

10. The system of claim 1 wherein the support structure provides additional structural support to the region to support of the part being manufactured.

11. The system of claim 1 wherein a first slice of the set of one or more slices is determined using at least one initial reference point positioned away from an end of the region to support.

12. A method comprising:
identifying, by a computing device in communication with an additive manufacturing component, the computing device having a processor and an addressable memory, a region to support on the part being manufactured;
determining, by the computing device, a set of one or more slices via an iterative process, on the region to support on the part, wherein each slice of the set of one or more slices comprises a set of reference points;
determine, by the computing device, a position for each reference point of the set of reference points on a current slice of the set of one or more slices based on a maximum gradient vector associated with the position of a reference point on a previously determined slice, wherein the maximum gradient vector is along a maximum three-dimensional slope of the support structure;
determining, by the computing device, a set of support lines based on the determined position of each reference point of the set of reference points on the current slice and each reference point of the set of reference points on the previously determined slice of the set of one or more slices, wherein the set of support lines are between two reference points of two distinct slices of the set of one or more slices;
determining, by the computing device, a density associated with the determined set of support lines on the region to support, wherein the density is determined based on comparing a distance between each support line with adjacent support lines of the set of support lines;

adjusting, by the computing device, the determined set of support lines based on the determined density associated with the determined set of support lines falling in a range of a minimum density and a maximum density via addition of at least one new reference point to the set of reference points in order to start a new support line to add to the set of support lines and removal of at least one reference point from the set of reference points in order to terminate a support line of the set of support lines; and
transmitting, by the computing device, instructions to the additive manufacturing component based on the determined and adjusted set of support lines; and
executing, by the additive manufacturing component having tools for manufacturing parts and a support structure associated with a part being manufactured, a series of instructions to connect the support structure to the region to support based on the transmitted instructions, and
wherein the maximum three-dimensional slope of the maximum gradient vector is calculated by first taking the cross product of a surface normal vector $\vec{n}$ at the position of the reference point on the previously determined slice and the downward vector $\vec{z}$ to find a first vector and then taking the cross product between the first vector and the surface normal vector $\vec{n}$.

13. The method of claim 12 wherein at each iteration of the determination of the set of support lines, the density of the set of support lines is calculated.

14. The method of claim 13 wherein at each iteration of the determination of the set of support lines, along each support line, the distance between each reference point associated with each support line and nearest neighbor reference point associated with each support line of the set of support line§ is calculated along a given slice of the set of one or more slices.

15. The method of claim 14 wherein at each iteration of the determination of the set of support lines, support lines are terminated to prevent the density from exceeding the maximum density.

16. The method of claim 15 wherein each slice comprises at least one reference point, and one or more adjacent reference points are removed in order to decrease the density below the maximum density.

17. The method of claim 14 wherein at each iteration of the determination of the set of support lines, if the density is below the minimum density, the distance between adjacent reference points on at least a pair of adjacent support lines of the set of support lines is divided in half and a new reference point is created at that midpoint between the support lines.

18. The method of claim 17 wherein each slice comprises at least one reference point and a set of one or more reference points are added to a slice to increase the density above the minimum density.

19. The method of claim 12 wherein the set of support lines are further determined by calculating a maximum gradient vector for each support line of the set of support lines.

20. The method of claim 12 wherein region to support is defined by an angle that the surface of the region to support subtends relative to the (negative) z direction.

21. The method of claim 12 wherein the support structure provides additional structural support to the region to support of the part being manufactured.

* * * * *